(12) United States Patent
Kikuchi et al.

(10) Patent No.: US 11,463,613 B2
(45) Date of Patent: Oct. 4, 2022

(54) DETECTION DEVICE AND DETECTION METHOD

(71) Applicant: Olympus Corporation, Hachioji (JP)

(72) Inventors: Tetsuo Kikuchi, Hachioji (JP); Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/464,525

(22) Filed: Sep. 1, 2021

(65) Prior Publication Data

US 2022/0078352 A1 Mar. 10, 2022

(30) Foreign Application Priority Data

Sep. 7, 2020 (JP) .............................. JP2020-149838

(51) Int. Cl.
*H04N 5/232* (2006.01)
*H04N 5/369* (2011.01)
*H04N 9/73* (2006.01)

(52) U.S. Cl.
CPC ....... *H04N 5/232122* (2018.08); *H04N 9/735* (2013.01)

(58) Field of Classification Search
CPC ......... H04N 5/232122; H04N 5/36961; H04N 5/36965
USPC ....................................................... 348/345
See application file for complete search history.

(56) References Cited

U.S. PATENT DOCUMENTS

| | | | | |
|---|---|---|---|---|
| 2021/0175269 A1* | 6/2021 | Fujita | .................... | H04N 5/3559 |
| 2021/0280619 A1* | 9/2021 | Okamoto | ............... | G03B 13/36 |
| 2021/0375975 A1* | 12/2021 | Kobayashi | ........ | H01L 27/14621 |

FOREIGN PATENT DOCUMENTS

| | | | | |
|---|---|---|---|---|
| JP | 2015-162658 | | 9/2015 | |
| WO | WO-2019102887 A1 * | | 5/2019 | ........... H01L 27/146 |
| WO | WO-2020241717 A1 * | | 12/2020 | |

* cited by examiner

*Primary Examiner* — Anthony J Daniels
(74) *Attorney, Agent, or Firm* — John C. Pokotylo; Pokotylo Patent Services

(57) ABSTRACT

A detection device, comprising an image sensor provided with a plurality of pixels having a plurality of light receiving sections corresponding to a micro lens, capable of adding output signals of the plurality of light receiving sections in accordance with phase difference detection direction and outputting an added signal, and a processor for performing focus detection or depth detection using phase difference detection, based on the added signal of the image sensor, whereby the image sensor makes height of a potential barrier between the light receiving sections different in accordance with the plurality of phase difference detection directions, and the processor sets charge storage determination level differently in accordance with the phase difference detection direction, and controls charge storage operation of the image sensor based on the added signal and the charge storage determination level.

20 Claims, 15 Drawing Sheets

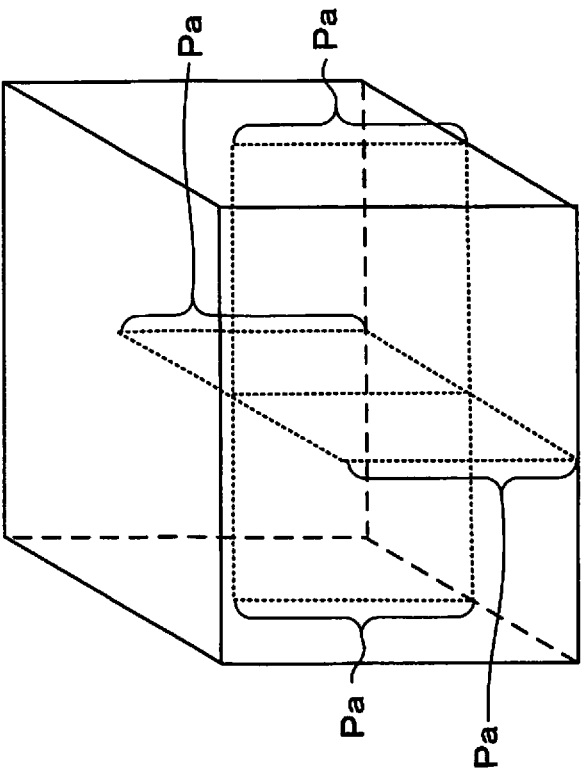
FIG. 4B  UNIFORMITY
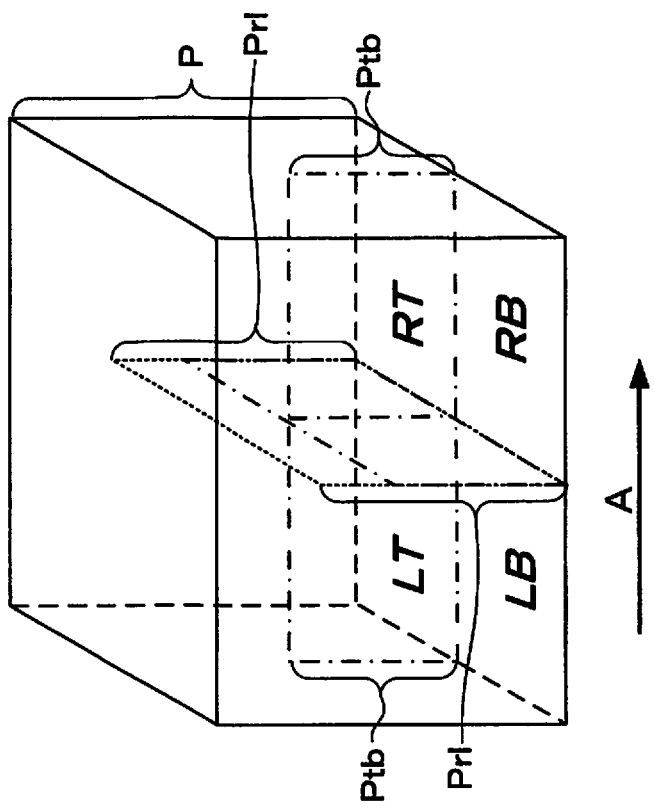
FIG. 4A  RL PIXEL PRIORITY

FIG. 6

|  |  | m1 | m2 | m3 | m4 | m5 | m6 | m7 | m8 | m9 | m10 | m11 | m12 | m13 | m14 | m15 | m16 | m17 | m18 | m19 | m20 |
|---|---|---|---|---|---|---|---|---|---|---|---|---|---|---|---|---|---|---|---|---|---|
| n1 |  | Rl | Rr | Grl | Grr | Rl | Rr | Grl | Grr | Rl | Rr | Grl | Grr | Rl | Rr | Grl | Grr | Rl | Rr | Grl | Grr |
| n2 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n3 |  | Rl | Rr | Grl | Grr | Rl | Rr | Grl | Grr | Rl | Rr | Grl | Grr | Rl | Rr | Grl | Grr | Rl | Rr | Grl | Grr |
| n4 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n5 | (+) | Rl | Rr | Grl | Grr | Rl | Rr | Grl | Grr | Rl | Rr | Grl | Grr | Rl | Rr | Grl | Grr | Rl | Rr | Grl | Grr |
| n6 | (+) | Gbl | Gbr | Bl | Br | Gbl | Gbr | Bl | Br | Gbl | Gbr | Bl | Br | Gbl | Gbr | Bl | Br | Gbl | Gbr | Bl | Br |
| n7 |  | Rl | Rr | Grl | Grr | Rl | Rr | Grl | Grr | Rl | Rr | Grl | Grr | Rl | Rr | Grl | Grr | Rl | Rr | Grl | Grr |
| n8 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n9 |  | Rl | Rr | Grl | Grr | Rl | Rr | Grl | Grr | Rl | Rr | Grl | Grr | Rl | Rr | Grl | Grr | Rl | Rr | Grl | Grr |
| n10 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n11 |  | Rl | Rr | Grl | Grr | Rl | Rr | Grl | Grr | Rl | Rr | Grl | Grr | Rl | Rr | Grl | Grr | Rl | Rr | Grl | Grr |
| n12 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n13 |  | Rl | Rr | Grl | Grr | Rl | Rr | Grl | Grr | Rl | Rr | Grl | Grr | Rl | Rr | Grl | Grr | Rl | Rr | Grl | Grr |
| n14 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n15 |  | Rl | Rr | Grl | Grr | Rl | Rr | Grl | Grr | Rl | Rr | Grl | Grr | Rl | Rr | Grl | Grr | Rl | Rr | Grl | Grr |
| n16 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n17 |  | Rl | Rr | Grl | Grr | Rl | Rr | Grl | Grr | Rl | Rr | Grl | Grr | Rl | Rr | Grl | Grr | Rl | Rr | Grl | Grr |
| n18 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n19 |  | Rl | Rr | Grl | Grr | Rl | Rr | Grl | Grr | Rl | Rr | Grl | Grr | Rl | Rr | Grl | Grr | Rl | Rr | Grl | Grr |
| n20 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n21 |  | Rl | Rr | Grl | Grr | Rl | Rr | Grl | Grr | Rl | Rr | Grl | Grr | Rl | Rr | Grl | Grr | Rl | Rr | Grl | Grr |
| n22 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n23 | (+) | Rl | Rr | Grl | Grr | Rl | Rr | Grl | Grr | Rl | Rr | Grl | Grr | Rl | Rr | Grl | Grr | Rl | Rr | Grl | Grr |
| n24 | (+) | Gbl | Gbr | Bl | Br | Gbl | Gbr | Bl | Br | Gbl | Gbr | Bl | Br | Gbl | Gbr | Bl | Br | Gbl | Gbr | Bl | Br |
| n25 |  | Rl | Rr | Grl | Grr | Rl | Rr | Grl | Grr | Rl | Rr | Grl | Grr | Rl | Rr | Grl | Grr | Rl | Rr | Grl | Grr |
| n26 |  | Gbl | Gbr | Bl | Br | Gbl | Gbr | Bl | Br | Gbl | Gbr | Bl | Br | Gbl | Gbr | Bl | Br | Gbl | Gbr | Bl | Br |
| n27 |  | Rl | Rr | Grl | Grr | Rl | Rr | Grl | Grr | Rl | Rr | Grl | Grr | Rl | Rr | Grl | Grr | Rl | Rr | Grl | Grr |
| n28 |  | Gbl | Gbr | Bl | Br | Gbl | Gbr | Bl | Br | Gbl | Gbr | Bl | Br | Gbl | Gbr | Bl | Br | Gbl | Gbr | Bl | Br |

⬇

|  | L | R | L | R | L | R | L | R | L | R | L | R | L | R | L | R | L | R | L | R |
|---|---|---|---|---|---|---|---|---|---|---|---|---|---|---|---|---|---|---|---|---|
|  | m1 | m2 | m3 | m4 | m5 | m6 | m7 | m8 | m9 | m10 | m11 | m12 | m13 | m14 | m15 | m16 | m17 | m18 | m19 | m20 |
| n1 | Gr | Gr | Gr | Gr | Gr | Gr | Gr | Gr | Gr | Gr | Gr | Gr | Gr | Gr | Gr | Gr | Gr | Gr | Gr | Gr |
| n2 | Gb | Gb | Gb | Gb | Gb | Gb | Gb | Gb | Gb | Gb | Gb | Gb | Gb | Gb | Gb | Gb | Gb | Gb | Gb | Gb |
| n3 | Gr | Gr | Gr | Gr | Gr | Gr | Gr | Gr | Gr | Gr | Gr | Gr | Gr | Gr | Gr | Gr | Gr | Gr | Gr | Gr |
| n4 | Gb | Gb | Gb | Gb | Gb | Gb | Gb | Gb | Gb | Gb | Gb | Gb | Gb | Gb | Gb | Gb | Gb | Gb | Gb | Gb |
| n5 | Gr | Gr | Gr | Gr | Gr | Gr | Gr | Gr | Gr | Gr | Gr | Gr | Gr | Gr | Gr | Gr | Gr | Gr | Gr | Gr |
| n6 | Gb | Gb | Gb | Gb | Gb | Gb | Gb | Gb | Gb | Gb | Gb | Gb | Gb | Gb | Gb | Gb | Gb | Gb | Gb | Gb |

FIG. 7

|  | RL SATURATION DETERMINATION LEVEL | TB SATURATION DETERMINATION LEVEL |
|---|---|---|
| GAIN 0dB | 1400LSB | 450LSB |
| GAIN 6dB | 2800LSB | 900LSB |
| GAIN 12dB | 3800LSB | 1800LSB |
| GAIN 18dB | 3800LSB | 3600LSB |

DETECTION DEVICE AND DETECTION METHOD

CROSS-REFERENCE TO RELATED APPLICATIONS

Benefit is claimed, under 35 U.S.C. § 119, to the filing date of prior Japanese Patent Application No. 2020-149838 filed on Sep. 7, 2020. This application is expressly incorporated herein by reference. The scope of the present invention is not limited to any requirements of the specific embodiments described in the application.

BACKGROUND OF THE INVENTION

1. Field of the Invention

The present invention relates to a detection device that has an image sensor provided with a plurality of pixels corresponding to micro lenses, obtains phase difference of an output signal using a plurality of pixel outputs, and can perform focus detection or depth detection based on this phase difference.

2. Description of the Related Art

A focus detection device is known in which a plurality of micro lenses and a plurality of pixels corresponding to each micro lens are arranged on an image plane of an image sensor, a plurality of light fluxes that pass through regions in which exit pupils of an imaging optical system have been divided are respectively subjected to photoelectric conversion by each pixel, phase difference of these output signals that have been subjected to photoelectric conversion is detected, and defocus amount of imaging light flux is detected based on this phase difference. It is also known to adding output signals of each pixel that has been divided and use the resulting signal as an image signal of a single pixel.

For example, a photoelectric conversion device shown in Japanese patent laid-open No, 2015-162658 (hereafter referred to as "patent publication 1") has a configuration with divided photodiodes (PD) being arranged in correspondence with a single micro lens of an image sensor, and phase difference detection in a lateral (RL) direction is performed using pixel outputs resulting from adding electrical charge of upper and lower (TB) PDs among the four divided PDs. Also, phase difference detection in a vertical (TB) direction is performed using pixel output resulting from adding electrical charge of lateral (RL) PDs.

If light is irradiated to a pixel of the image sensor from an angle, electrical charge generated as a result of photoelectric conversion on each of a pair of pixels will be different, and the electrical charge of some pixels will be saturated. In this case, linearity of an image signal that has a pair of pixel signals (electrical charge) combined by addition is lost. With patent publication 1, if electrical charge amount that has been photoelectrically converted is saturated in any one of the 4-divided PDs, phase difference detection will not be possible for either RL or TB. As a result, with patent publication 1 a threshold voltage corresponding to electrical charge amount (saturation) equivalent to a potential barrier of one PD is required to be set to ¼ of a normal threshold voltage.

As shown in patent publication 1, if a potential barrier between PDs is made lower, a combined image signal is not saturated, even if some pixels (PDs) are saturated. However, with patent publication 1 since a threshold voltage must be set to ¼ of a normal threshold voltage, dynamic range of a signal for focus detection (AF) becomes insufficient, and detection accuracy is lowered.

SUMMARY OF THE INVENTION

The present invention has been conceived in view of this type of situation, and provides a detection device and detection method that can perform high precision and high speed focus detection or depth detection.

A detection device of a first aspect of the present invention comprises an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal, and a controller for performing focus detection or depth detection using phase difference detection, based on the added signal of the image sensor, whereby the image sensor makes height of a potential barrier between the light receiving sections different in accordance with the plurality of phase difference detection directions, and the controller executes a charge storage operation of the image sensor by instructing a specified phase difference detection direction to the image sensor, sets a charge storage determination level that differs in accordance with the phase difference detection direction, and controls a charge storage operation of the image sensor based on the added signal and the charge storage determination level.

A detection method of a second aspect of the present invention is a detection method for a detection device that has an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal, the detection method comprising, making height of a potential barrier between the light receiving sections different in accordance with the plurality of phase difference detection directions, and executing a charge storage operation of the image sensor by instructing a specified phase difference detection direction to the image sensor, setting a charge storage determination level that differs in accordance with the phase difference detection direction, controlling a charge storage operation of the image sensor based on the added signal and the charge storage determination level, and performing focus detection or depth detection using phase difference detection based on the added signal of the image sensor.

A non-transitory computer-readable medium of a third aspect of the present invention, storing a processor executable code, which when executed by at least one processor, performs a detecting method, the processor being provided in a detection device, the detection device having an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal the detecting method comprising, making height of a potential barrier between the light receiving sections different in accordance with the plurality of phase difference detection directions, executing a charge storage operation of the image sensor by instructing a specified phase difference detection direction to the image sensor, setting a charge storage determination level that differs in accordance with the phase difference detection direction, controlling a charge storage operation of the image sensor based on the added signal and the charge storage determination level, and performing focus detection or depth detection using phase difference detection based on the added signal of the image sensor.

BRIEF DESCRIPTION OF THE DRAWINGS

FIG. 4A and FIG. 4B are drawings for describing potential barrier, of a 4PD pixel type pixel section, in the imaging device of one embodiment of the present invention, with FIG. 4A being a case of RL pixel priority, and FIG. 4B being a case of both pixel uniformity.

FIG. 6 is a drawing for describing pixel addition at the time of RL readout, in the imaging device of one embodiment of the present invention.

FIG. 7 is a drawing for describing pixel addition at the time of TB readout, in the imaging device of one embodiment of the present invention.

DETAILED DESCRIPTION OF THE PREFERRED EMBODIMENTS

Figure 1:
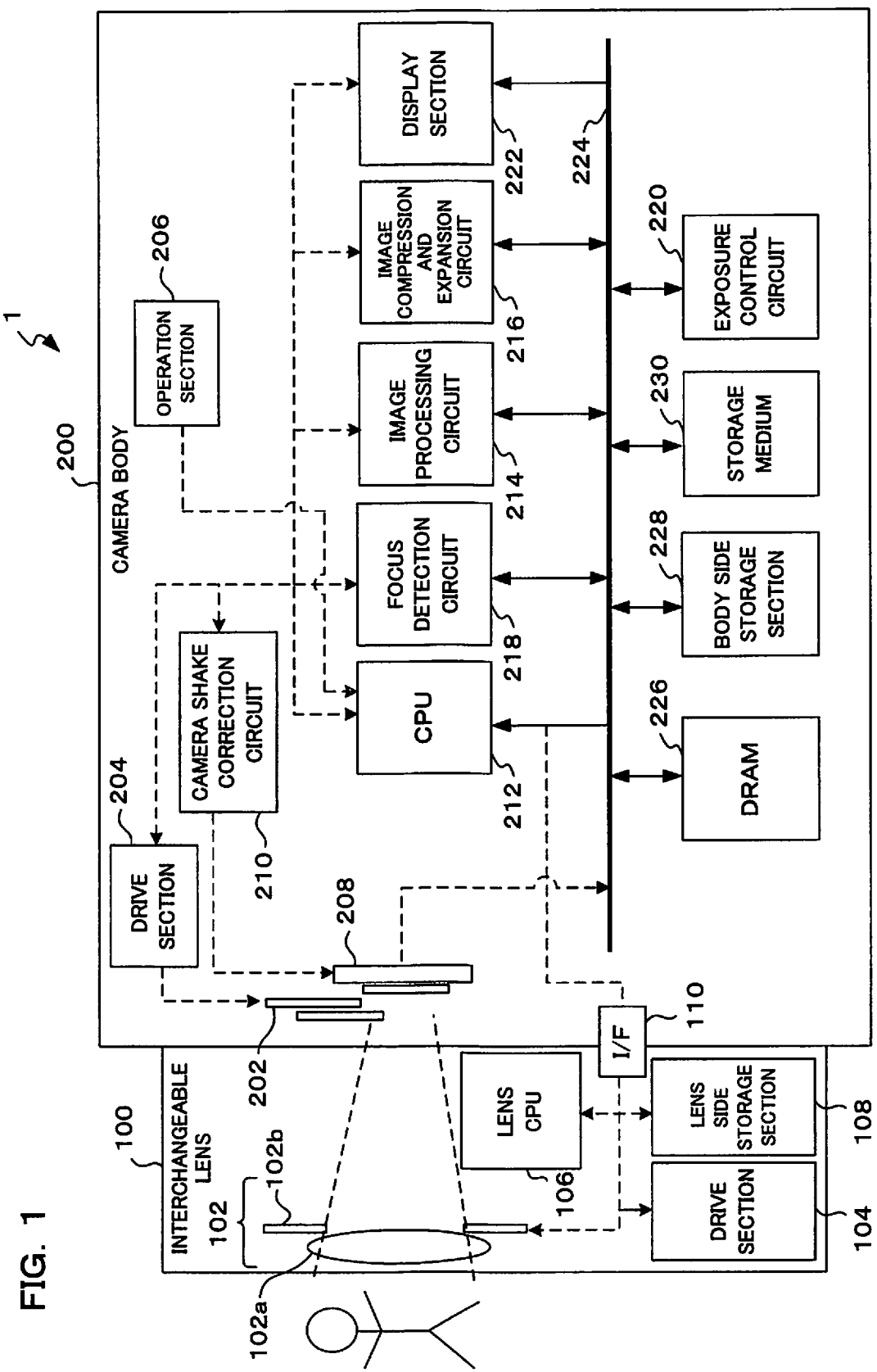
FIG. 1 is a block diagram mainly showing the electrical structure of an imaging device of one embodiment of the present invention.

An imaging device of one embodiment of the present invention will be described in the following. This imaging device has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Also, image data that has been stored in the storage medium can be subjected to playback display on the display section if playback mode is selected.

Also, an image sensor 208 of an imaging device of this embodiment is provided with a plurality of pixels having a plurality of light receiving sections corresponding to micro lenses, and the plurality of light receiving sections are provided in correspondence with a specified plurality of phase difference detection directions (refer to FIG. 3A, FIG. 3B, FIG. 6 and FIG. 7). Also, the image sensor 208 makes height of a potential barrier between light receiving sections different depending on phase difference detection direction (refer to FIG. 4A).

With this embodiment, specifically, 4-divided photodiodes are arranged in correspondence with a single micro lens of the image sensor (refer to FIG. 3A), and phase difference detection is performed with priority given to a horizontal direction (left right direction) over the vertical direction (up down direction) when detecting phase difference. Regarding a potential barrier between R pixels that are arranged on the right side and have been vertically added (hereafter, R pixels) and L pixels that are arranged on the left side and have been vertically added (hereafter, L pixels), and a potential barrier between T pixels that are arranged on the top and have been horizontally added (hereafter, T pixels) and B pixels that are arranged on the bottom and have been vertically added (hereafter, B pixels), the potential barriers are suitable for RL pixel priority (refer to FIG. 4A). Specifically, the potential barrier between T pixels that are arranged on the top and B pixels that are arranged on the bottom is set lower than the potential barrier between R pixels and L pixels. (for example, the potential barrier is set to 1/2, refer to FIG. 4A). In a case of 2PD (R/L pixels or T/B pixels) readout in order to perform horizontal (vertical) phase difference detection with vertical (left right) addition, threshold voltages (charge storage determination level and saturation determination level that will be described later (refer, for example, to S9 to S15 in FIG. 9A, and S27 to S33 in FIG. 9B)) corresponding to height of a potential barrier of a pair of pixels to be read out are set, and a charge storage operation is performed.

In the case of 2PD readout for phase difference detection, a threshold voltage for saturation determination of pixel data at the time of readout with R/L pixels is set to a threshold voltage corresponding to electrical charge amount for 2PDs corresponding to the potential barrier of the R/L pixels (for example, double the threshold voltage for 1PD (1/2 the threshold voltage for 4PDs)). As a result, it is possible to simply achieve a larger dynamic range of a signal for R/L pixels with high readout speed and high readout efficiency, and it becomes possible to increase AF precision and make AF high speed. It should be noted, regarding readout of R/L pixel signals corresponding to horizontal phase difference detection, that since increase and decrease in the number of lines that are read out has little effect on phase difference detection precision, it is easy to reduce the number of lines that are read out by pixel addition or pixel thinning. On the other hand, regarding readout of T/B pixel signals corresponding to vertical phase difference detection, since increase or decrease in the number of lines that are read out has a significant effect on phase difference detection precision, a reduction in the number of lines that are read out will lower precision. For this reason, with readout of R/L pixel signals it is simple to make readouts be high-speed while maintaining precision, and readout efficiency is higher.

FIG. 1 is a block diagram showing one example of the structure of an imaging device (specifically, a digital camera, for example) 1 that includes a focus detection device of one embodiment of the present invention. It should be noted that in FIG. 1 solid line arrows show flow of data, and dashed line arrows show flow of control signals.

An imaging device 1 comprises an interchangeable lens 100 and a camera body 200. The interchangeable lens 100 is configured so that it is possible to attach to the camera body 200. When the interchangeable lens 100 is attached to the camera body 200, the interchangeable lens 100 and the camera body 200 are connected so that communication is possible between them. It should be noted that the imaging device 1 is not necessarily a lens interchangeable imaging device. For example, the imaging device 1 may be a lens integrated imaging device. The imaging device may also be provided within a portable device, such as a smart phone.

The interchangeable lens 100 comprises an imaging optical system 102, a drive section 104, a lens CPU (Central Processing Unit) 106, and a lens side storage section 108. Here, each block of the interchangeable lens 100 is configured using hardware, for example. However, all blocks do not necessarily have to be configured using hardware, and some sections may be configured using software. Also, each block of the interchangeable lens 100 need not be configured using a single hardware or software component, and may be configured using a plurality of hardware or software components. Also, in a case where the interchangeable lens and the camera body are integrated, the lens CPU 106 and the CPU 212 may be configured as a single CPU.

The imaging optical system 102 is an optical system imaging light flux from a subject on to the image sensor 208 of the camera body 200. The imaging optical system 102 comprises a focus lens 102a and an aperture 102b. The focus lens 102a is constructed so as to be able to adjust focal position of the imaging optical system 102 by moving in an optical axis direction.

The aperture 102b is arranged on the optical axis of the focus lens 102a. The opening diameter of the aperture 102b is variable. The aperture 102b adjusts amount of light from a subject passing through the focus lens 102a that is incident on the image sensor 208. The drive section 104 has a drive motor and a drive circuit etc., and drives the focus lens 102a and the aperture 102b based on control signals output from the lens CPU 106. Here, the imaging optical system 102 may be configured as a zoom lens. In this case, the drive section 104 may also perform zoom drive, and focal length may also be changed by manual operation of the user. The drive section 104 functions as an aperture drive section (actuator, driver) for driving the aperture that is included in the imaging optical system.

The lens CPU 106 is a processor that includes a CPU and peripheral circuits for the CPU, and operates in accordance with programs stored in a lens side storage section 108. The lens CPU 106 is configured so as to be able to communicate with the CPU 212 of the camera body 200 via an interface (I/F) 110. The lens CPU 106 controls the drive section 104 in accordance with control signals from the CPU 212 of the camera body 200. Also, the lens CPU 106 transmits various information, such as aperture value (F value) of the aperture 102b, and lens information etc. stored in the lens side storage section 108, to the CPU 212 via the I/F 110. The lens CPU 106 functions as a focus lens control section that controls position of the focus lens contained in the imaging optical system. This focus lens control section communicates with a control section to execute position control of the focus lens in synchronization with a first imaging operation and second imaging operation of the image sensor.

It should be noted that the lens CPU 106 is not necessarily configured as a CPU. That is, functions that are the same as those of the lens CPU 106 may also be implemented using a processor such as an ASIC (Application Specific Integrated Circuit) or FPGA (Field-Programmable Gate Array) etc. Also, functions that are the same as those of the lens CPU 106 may also be implemented using software.

The lens side storage section 108 is an electrically rewritable nonvolatile memory, and stores lens information etc. relating to the interchangeable lens 100, as well as the above described programs. Lens information includes, for example, focal length information and aberration information of the imaging optical system 102.

The camera body 200 comprises a mechanical shutter 202, a drive section 204, an operation section 206, the image sensor 208, a hand shake correction circuit 210, the CPU 212, an image processing circuit 214, an image compression and expansion section 216, a focus detection circuit 218, an exposure control circuit 220, a display section 222, a bus 224, DRAM (Dynamic Random Access Memory) 226, a body side storage section 228, and a storage medium 230. Here, each block of the camera body 200 is configured using hardware, for example. However, all blocks and circuits do not necessarily have to be configured using hardware, and some sections may be configured using software. Also, each block of the camera body 200 need not be configured using a single hardware or software component, and may be configured using a plurality of hardware or software components.

The mechanical shutter 202 has an opening and closing structure, and adjusts a time for which light flux from the subject is incident on the image sensor 208 (exposure time of the image sensor 208). A focal plane shutter, for example, is adopted as the mechanical shutter 202. Besides this focal plane shutter, a lens shutter may be provided at the lens barrel side. The drive section 204 drives the mechanical shutter 202 based on control signals from the CPU 212. The drive section 204 comprises an actuator that drives the mechanical shutter 202, and drive circuitry etc. for this actuator, and performs opening and closing operations of the mechanical shutter 202.

The operation section 206 is an interface for inputting user instructions to the imaging device 1, and includes various operation members such as various operation buttons like a power supply button, release button, movie button, mode dial, playback button, menu button, etc. and a touch panel etc. This operation section 206 detects operating state of the various operation members, and outputs signals representing detection results to the CPU 212.

The image sensor 208 is arranged on the optical axis of the imaging optical system 102, at a position that is behind the mechanical shutter 202, and where light flux from a subject is formed into an image by the imaging optical system 102. The image sensor 208 images a subject and generates a pixel signal relating to the subject.

The image sensor 208 has a pixel section 22 (refer to FIG. 2) with a plurality of imaging pixels arranged two-dimensionally. Imaging pixels are constructed divided into a plurality of focus detection pixels, corresponding to a microlens L (refer to FIG. 3A and FIG. 3B). The focus detection pixels generate photoelectric conversion signals by respectively subjecting light flux, that passes through regions resulting from subjecting a plurality of exit pupils of an imaging lens 2, which is an imaging optical system, to pupil-division, to photoelectric conversion. While the image sensor 208 is constructed as a single CMOS image sensor provided with a primary color Bayer array color filter, this structure is not limiting.

The image sensor 208 is an image sensor that is provided with a plurality of pixels having a plurality of light receiving sections (light receiving regions) corresponding to a micro lens, with the plurality of light receiving sections (light receiving regions) being provided in correspondence with a specified plurality of phase difference detection directions, capable of adding output signals of the plurality of light receiving sections in accordance with the phase difference detection direction and outputting an added signal. The above described pixels can output a pixel signal for every light receiving region. The image sensor makes height of a potential barrier between the light receiving sections different in accordance with the plurality of phase difference detection directions (refer, for example, to FIG. 4A). The image sensor is capable of amplifying and outputting an added signal (refer, for example, to FIG. 2, and to the analog processing section 23 of FIG. 10). The detailed structure of the image sensor 208 will be described later using FIG. 2, FIG. 3A and FIG. 3B.

The hand shake correction circuit 210 moves the image sensor 208 in directions parallel to the light receiving surface of the image sensor, so as to suppress camera shake that has been generated in the camera body 200. By moving the image sensor 208 so as to negate camera shake movement, blurring of the subject image occurring in image data that is attributable to camera shake is suppressed. It should be noted that the camera shake correction circuit may be provided in the interchangeable lens 100. A camera shake correction circuit in this case is configured so as to move a camera shake correction optical system that is included in the imaging optical system 102.

The CPU 212 is a processor that includes a CPU and peripheral circuits for the CPU, and performs overall control of the camera body 200 in accordance with programs stored in a body side storage section 228. The CPU 212 controls imaging operations (imaging drive mode, readout mode etc.) by the image sensor 208, for example. Also, the CPU 212 outputs control signals for driving the focus lens 102a to the lens CPU 106, in accordance with focus state of the focus lens 102a that has been detected by the focus detection circuit 218. The CPU 212 also outputs exposure setting values that have been calculated by the exposure control circuit 220 to the lens CPU 106 and the image sensor 208. Here, the CPU 212 is not necessarily configured as a CPU. Specifically, functions that are the same as those of the CPU 212 may also be implemented using an ASIC or FPGA etc. Also, functions that are the same as those of the CPU 212 may also be implemented using software.

The image processing circuit 214 applies various image processing to pixel data. For example, at the time of still picture shooting (also including rapid shooting), the image processing circuit 214 applies image processing for still picture storage and generates still picture data. Similarly, at the time of movie shooting, the image processing circuit 214 applies image processing for movie storage and generates movie data. Further, at the time of live view display the image processing circuit 214 applies image processing for display and generates display image data.

The image compression and expansion section 216 has an image compression circuit and an image expansion circuit. At the time of image data storage, the image compression and expansion section 216 compresses image data that has been generated by the image processing circuit 214 (still picture data or movie data). Also, at the time of image data playback, image data that is stored in the storage medium 230 in a compressed state is expanded.

The focus detection circuit 218 performs focus detection for the focus lens 102a using a phase difference method that uses focus detection pixel data output from the focus detection pixels of the image sensor 208. Also, the focus detection circuit 218 is capable of detecting depth of an object using phase difference detection results.

The focus detection circuit 218 functions as a control section (controller) that performs focus detection or depth detection using phase difference detection based on an added signal of an image sensor. It should be noted that functions of this control section (controller) are not limited to the focus detection circuit 218, and may also be taken on by other circuits and processors, such as the CPU 212 etc. The control section (controller) instructs a specified phase difference detection direction to the image sensor to execute a charge storage operation of the image sensor (refer, for example, to S5 in FIG. 9A and S23 in FIG. 9B), sets charge storage determination level that is different depending on phase difference detection direction (refer, for example, to S9 and S13 in FIG. 9A and S27 and S31 in FIG. 9B), and controls the charge storage operation of the image sensor based on an added signal and the charge storage determination level.

Figure 9A:
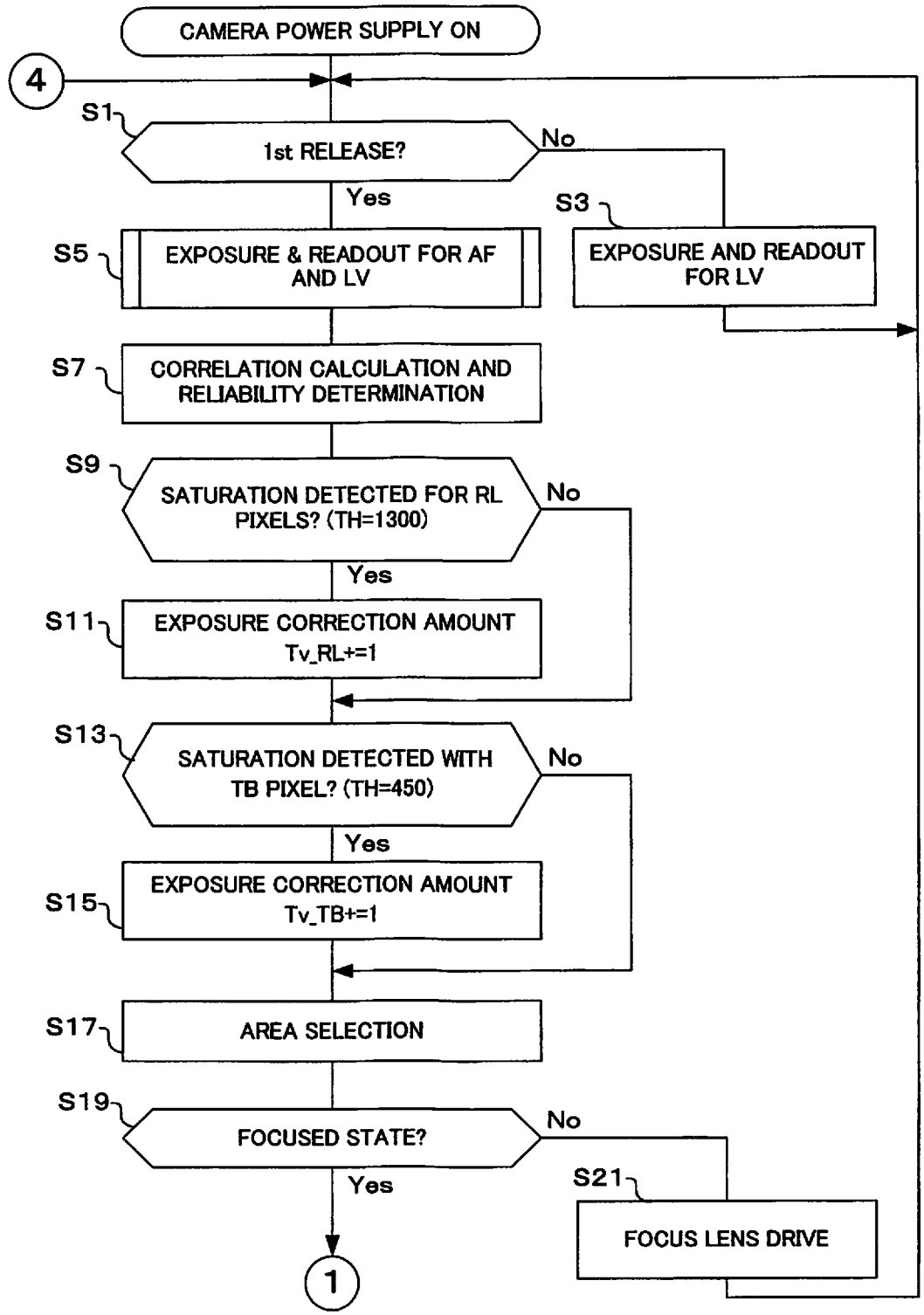
FIG. 9A to FIG. 9C are flowcharts showing operation of the imaging device of one embodiment of the present invention.
Figure 9B:
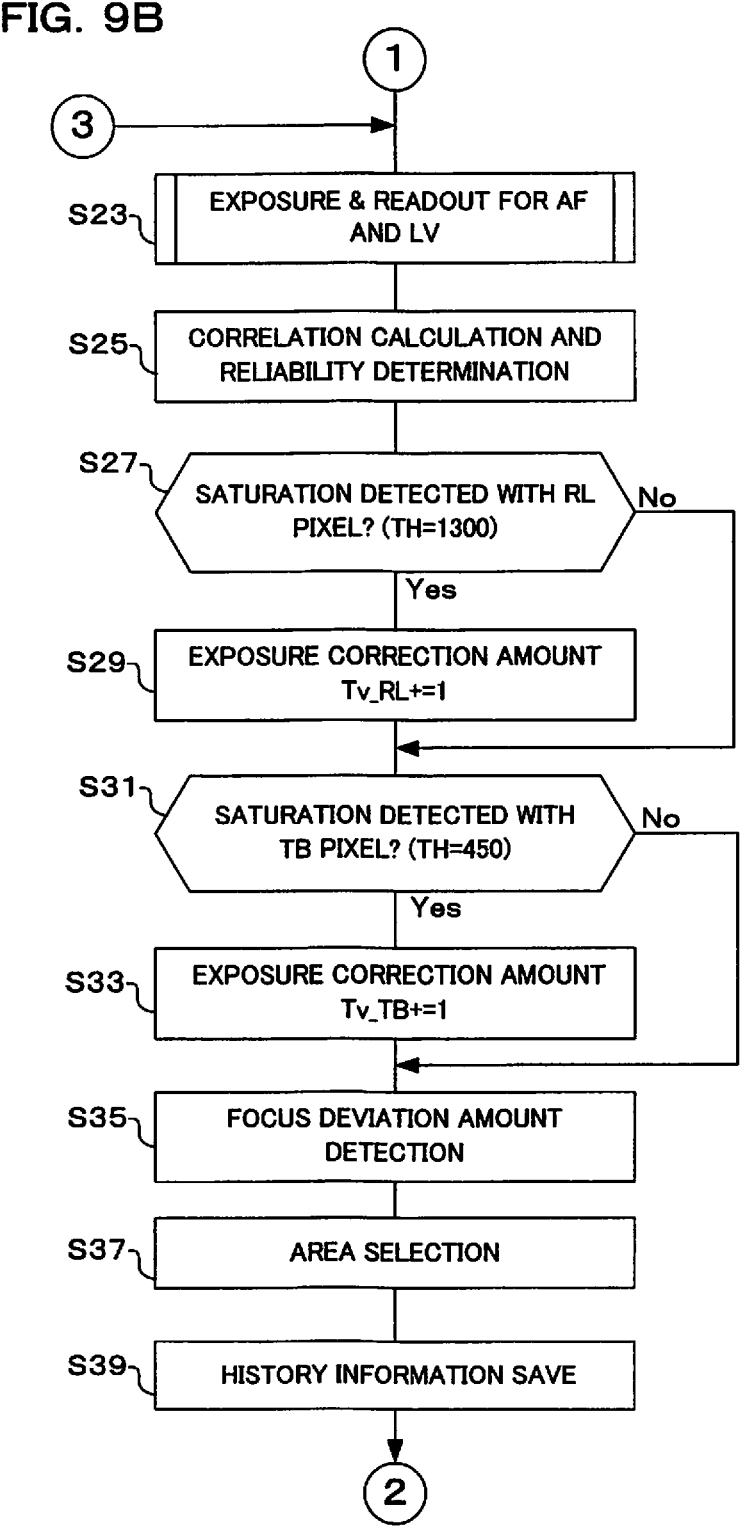

The above described control section (controller) also sets the charge storage determination level in accordance with height of a potential barrier corresponding to the phase difference detection direction (refer, for example, to S9 and S13 in FIG. 9A, and S27 and S31 in FIG. 9B). The control section (controller) compares the added signal and the charge storage determination level, and controls charge storage operation of the image sensor based on the comparison result (refer, for example, to S9 and S13 in FIG. 9A and to S27 and S31 in FIG. 9B).

Figures 11A, 11B:
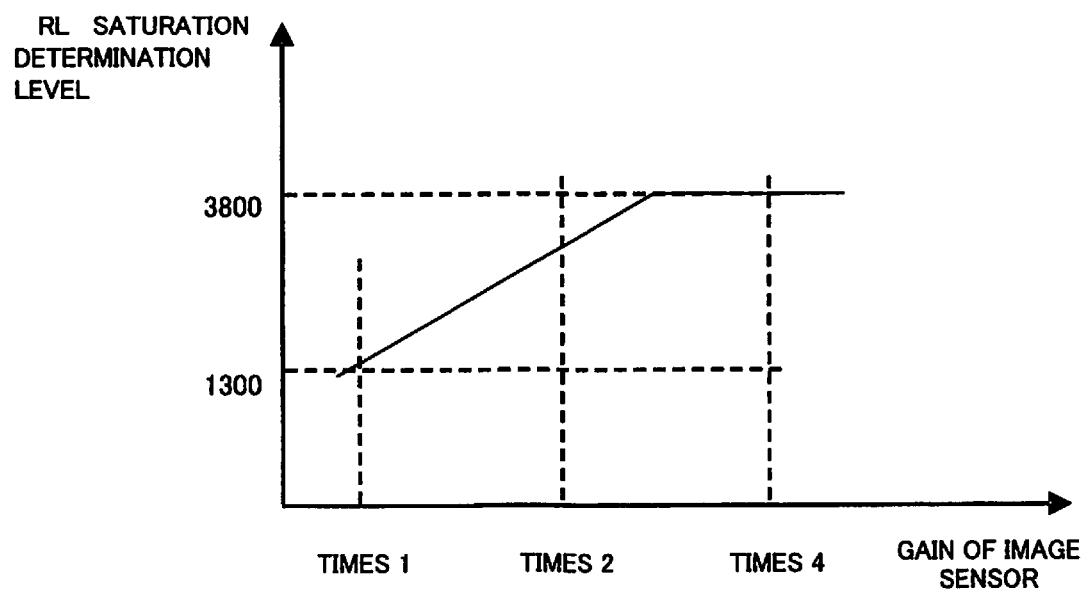
FIG. 11A and FIG. 11B are a graph and tables showing a relationship between gain of the image sensor and a saturation threshold value, in the imaging device of a first modified example of one embodiment of the present invention.

The above described control section (controller) also sets amplification factor of the image sensor and sets charge storage determination level in accordance with the amplification factor that has been set (refer, for example, to FIG. 11A and FIG. 11B). The control section (controller) sets a saturation determination level in accordance with heights of a potential barrier corresponding to the phase difference detection direction, and determines saturation by comparing the added signal output by the image sensor with the saturation determination level (refer, for example, to FIG. 11A and FIG. 11B). The control section (controller) performs focus detection or depth detection based on the determination result.

Figure 8:
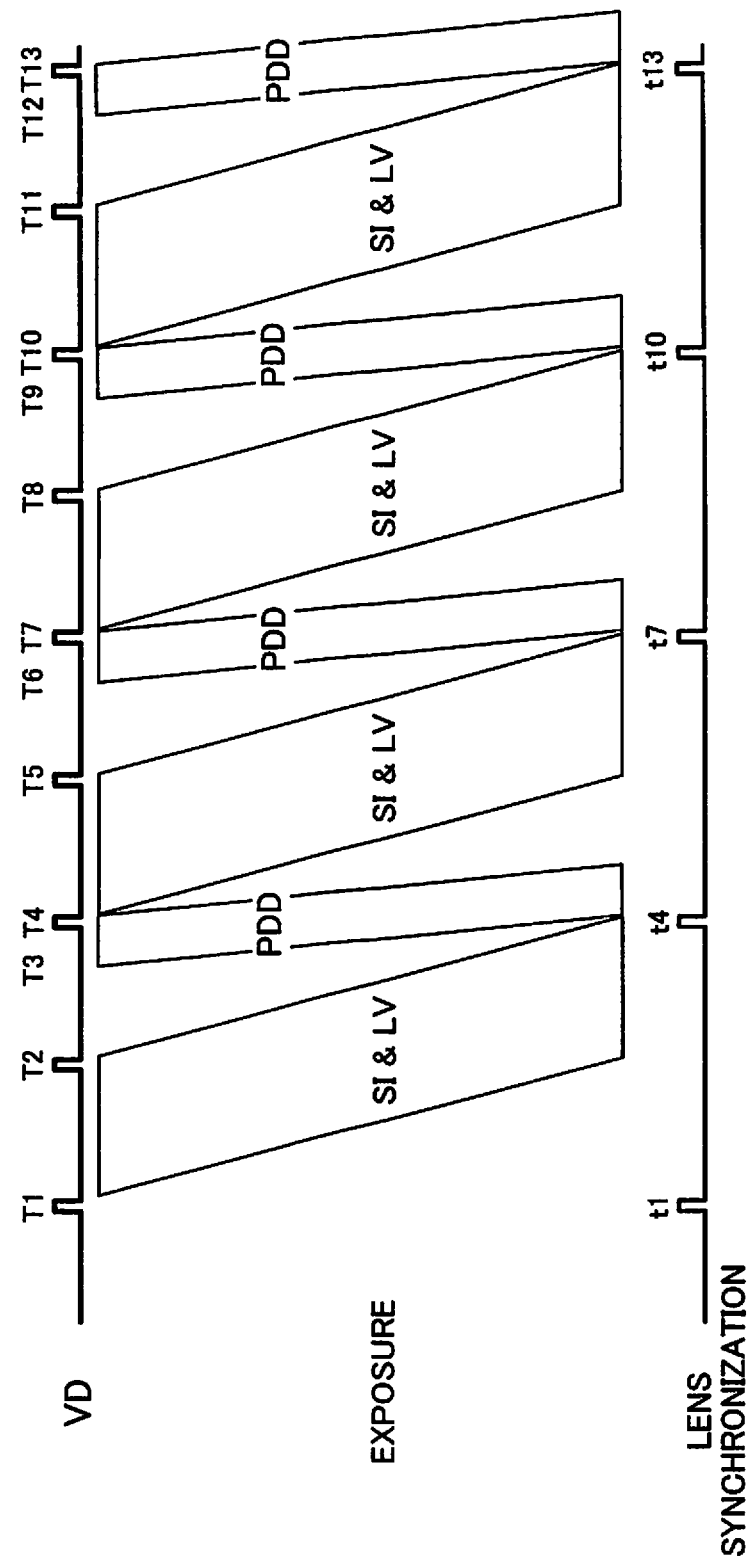
FIG. 8 is a drawing showing sequences at the time of rapid shooting, in the imaging device of one embodiment of the present invention.

Also, in a case where added signals of a plurality of light receiving sections corresponding to phase difference detection direction are acquired by causing imaging by the image sensor, between continuous shooting of still pictures, the control section (controller) reads out only added signals corresponding to a phase difference detection direction for which potential barrier has been set higher, as added signals of a plurality of light receiving section corresponding to phase difference detection direction (refer to FIG. 8, for example).

The exposure control circuit 220 fulfills a function as a photometry section, and calculates exposure setting values based on pixel data of the image sensor 208. This exposure control circuit 220 measures subject brightness from pixel data of the image sensor 208, and calculates exposure setting values necessary to make brightness of the subject at the time of shooting a correct value, from the subject brightness that has been measured. Exposure setting values include opening amount of the aperture 102b (aperture value) and exposure time of the image sensor 208 (shutter speed).

The display section 222 has a display such as a liquid crystal display or an organic EL display, and is arranged on a rear surface etc. of the camera body 200, and functions as an electronic viewfinder. This display section 222 displays images in accordance with control by the CPU 212. The display section 222 is used in live view display, and in playback display of already stored images etc.

The bus 224 is connected to the image sensor 208, CPU 212, image processing circuit 214, image compression and expansion section 216, focus detection circuit 218, exposure control circuit 220, display section 222, DRAM 226, body side storage section 228 and storage medium 230, and operates as a transfer circuit for transferring various data that has been generated by these blocks.

The DRAM 226 is an electrically rewritable volatile memory, and temporarily stores various data such as pixel data output from the image sensor 208, still picture data, movie data, display image data, and process data for the CPU 212 etc. It should be noted that it is also possible to use an SDRAM (synchronous dynamic random access memory) as temporary storage.

The body side storage section 228 is an electrically rewritable non-volatile memory. The body side storage section 228 stores various data such as programs used by the CPU 212 and adjustment values for the camera body 200 etc. The storage medium 230 is an electrically rewritable non-volatile memory, and is built into the camera body 200 or configured to be loaded into the camera body 200. The storage medium 230 stores image data for storage as an image file of a specified format. It should be noted that the DRAM 226, body side storage section 228, and storage medium 230 may be respectively configured as a single memory, or may be configured as a combination of a plurality of memories etc.

Next, the structure of the image sensor 208 will be described using FIG. 2. The image sensor 208 has image pixels, and these image pixels are divided into a plurality of focus detection pixels. Image pixels generate an image pixel signal and a focus detection pixel signal based on a photoelectric conversion signal that has been generated by photoelectric conversion of light flux by focus detection pixels. It should be noted that image pixels of this embodiment use photodiodes as light receiving sections.

Figure 2:
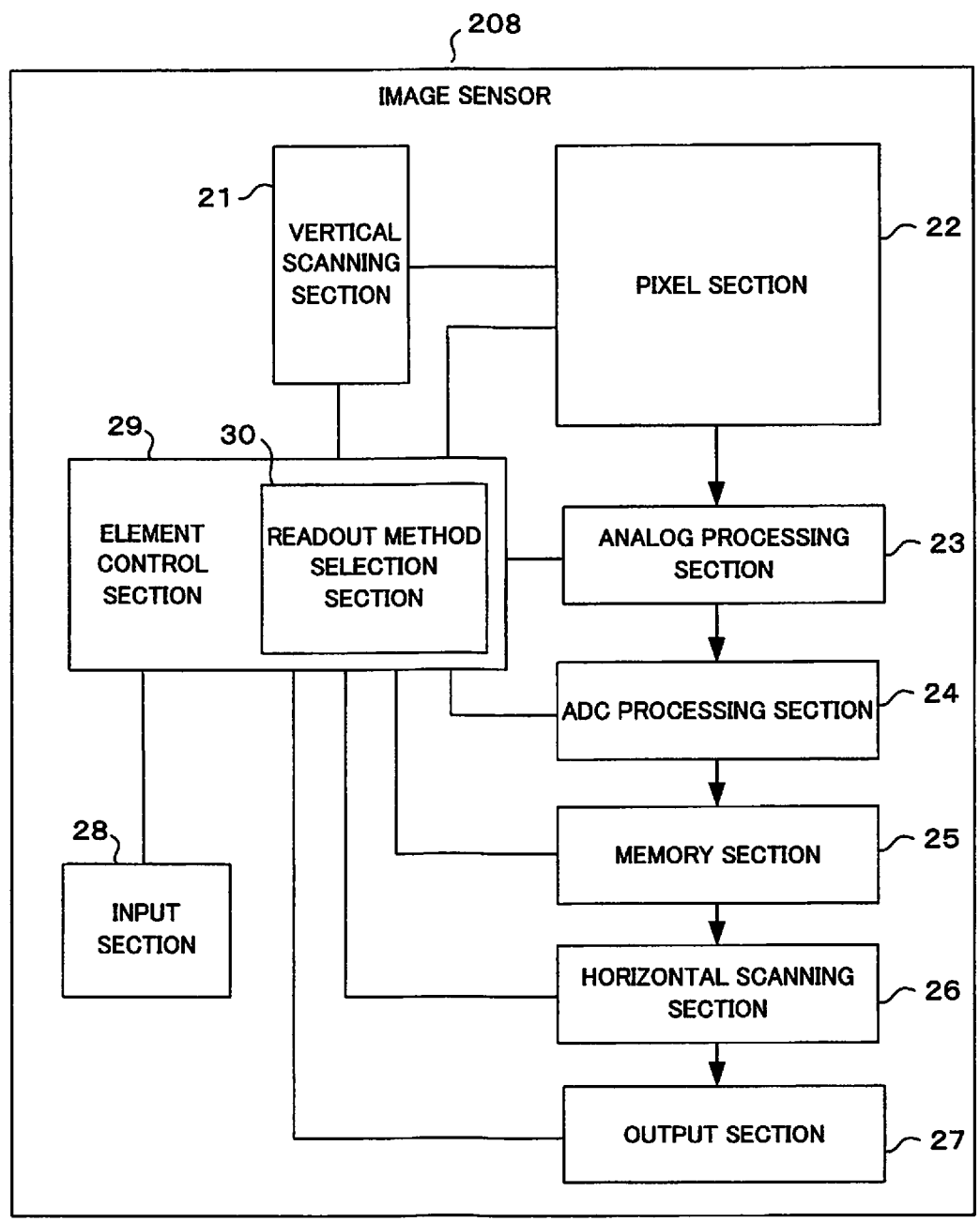
FIG. 2 is a block diagram mainly showing the electrical structure of an image sensor of an imaging device of one embodiment of the present invention.

In the example shown in FIG. 2, the image sensor 208 comprises a vertical scanning section 21, a pixel section 22, an analog processing section 23, an ADC processing section 24, memory section 25, horizontal scanning section 26, output section 27, input section 28, and element control section 29.

Image pixels and focus detection pixels are arranged in the pixel section 22. The image pixel signals and focus detection pixel signals are generated by photoelectric conversion of a subject image, and read out of these signals that have been generated is performed by at least one section among the vertical scanning section 21 to output section 27, and the element control section 29 etc.

The vertical scanning section 21 has a vertical scanning circuit, and performs scanning in a vertical direction by successively selecting pixel rows (lines) in a horizontal direction within the pixel section 22. This vertical scanning section 21 selects a particular line, and controls charge accumulation time of pixels (exposure time) by performing resetting and transfer of each pixel of the line that has been selected.

The analog processing section 23 has an analog processing circuit, and is a circuit for subjecting an analog pixel signal that has been read out from the pixel section 22 to analog signal processing. This analog processing section 23 includes, for example, a preamp that amplifies the pixel signal, and a correlated double sampling (CDS) circuit that subtracts reset noise from the pixel signal, etc.

The analog digital conversion processing section (ADC processing section) 24 has an A/D conversion circuit, and converts the analog pixel signal that has been output from the analog processing section 23 to digital pixel data. This ADC processing section 24 adopts a structure, such as exemplified by column ADC, for example, whereby a pixel signal that has been read out from the pixel section 22 is subjected to AD conversion by an analog to digital converter (ADC) for every column.

The memory section 25 has a memory, and is configured by an electrically rewritable volatile memory circuit etc. that temporarily holds pixel data that has been converted by the ADC processing section 24. The horizontal scanning section 26 has a horizontal scanning circuit, and reads out pixel data (image pixel data and focus detection pixel data) from the memory section 25 in the order of columns.

The output section 27 has an output circuit, and organizes pixel signals that have been read out from the horizontal scanning section 26 for generating pixel signal rows, converts to an output signal format such as a serial signal or differential signal etc. and outputs the converted result. It should be noted that this output section 27 or the above described ADC processing section 24 etc. function as a sensitization section that performs sensitization processing (signal amplification processing in accordance with ISO sensitivity that has been set).

The input section 28 has an input circuit, and receives synchronization signals, a reference clock, and operation setting information etc. relating to control of the image sensor 208 from the CPU 212 and a not-illustrated image sensor drive section.

The element control section 29 has an imaging control circuit, and is for controlling each block within the image sensor 208 in conformity with synchronization signals and a reference clock that have been received via the input section 28, and is provided with a readout method selection section 30. Also, the element control section 29 receives operation setting instructions, such as instructions for switching imaging drive mode, from the CPU 212 via the input section 28, and controls each block within the image sensor 208.

The readout method selection section 30 has a selection circuit, and selects and sets a readout method for readout from the image sensor 208 based on operation setting information (for example, camera modes such as still picture shooting, movie shooting, live view, AF etc.) that has been received via the input section 28. As readout methods some or all of a 1PD simple readout system, a 2PD additive readout system, a 4PD additive readout system with no phase difference information for reading out all added values of focus detection pixels, etc. may be set. Also, AF readout (AF (rl)), which will be described later, generates and reads out both of a pair of focus detection pixel signals (R/L pixel signals) for a first pupil-division direction based on a photoelectric conversion signal, using a 2PD additive read out method. Live view (LV) readout (LV+AF (tb)) generates and reads out both of a pair of focus detection pixel signals (T/B pixel signals) for a second pupil-division direction based on a photoelectric conversion signal, using a 2PD additive read out method. Actual exposure readout is generation of an image pixel signal by addition of all photoelectric conversion signals that have been generated within a single image pixel, using a 4PD additive readout method, and reading out of only the image pixel signal that has been generated.

Next, the structure of the focus detection pixels and image pixels arranged in the pixel section 22 will be described using FIG. 3A and FIG. 3B. As has been described above, the pixel section 22 is a pixel array section having image pixels and focus detection pixels arranged two dimensionally (in the vertical direction (column direction) and horizontal direction (line direction)).

Figure 3A:
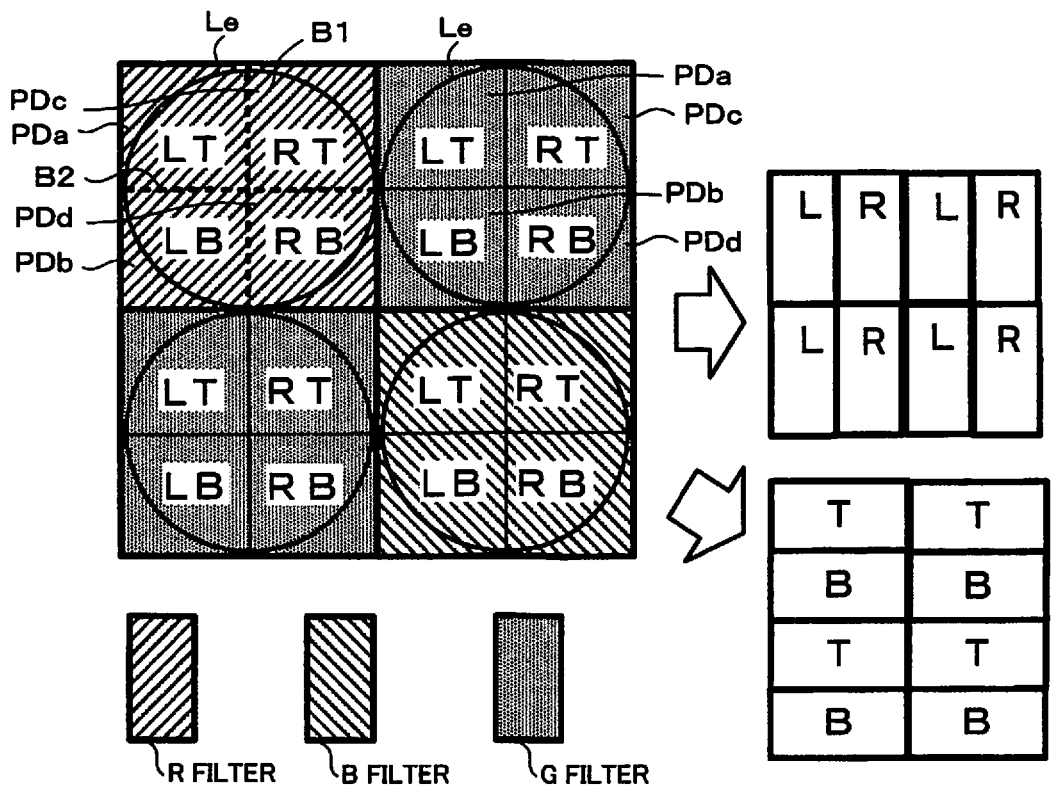
FIG. 3A is a block diagram showing the structure of a 4PD pixel type pixel, in the imaging device relating to one embodiment of the present invention.

FIG. 3A shows an example of a 4PD pixel structure, and is a pixel structure having four photodiodes PD arranged in a single micro lens Le. The 4PD pixel shown in FIG. 3A has a single color filter F and four photodiodes, PDa, PDb, PDc, and PDd arranged for a single micro lens Le. Each pixel is configured with a micro lens Le, color filter F and photodiodes PDa to PDd arranged sequentially in a lamination direction from an object side to an imaging surface, as shown in FIG. 3B. The micro lens Le is for increasing light amount reaching the 4PD pixels, as image pixels, by concentrating light, and effectively making an aperture ratio of the image pixels large. Regarding the color filter F, in a case, for example, of a primary color Bayer array color filter, either of an R filter, G filter or B filter is provided in accordance with that pixel position.

Figure 3B:
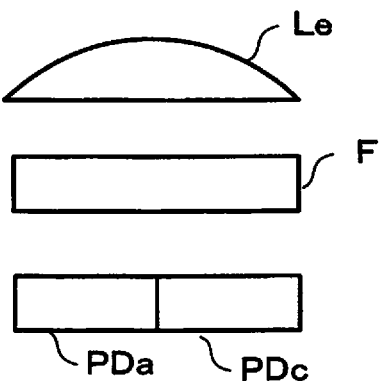
FIG. 3B is a cross section along an optical axis direction of a micro lens, for a 4PD pixel type pixel section, in the imaging device of one embodiment of the present invention.

With the 4PD pixel shown in FIG. 3A and FIG. 3B, photodiodes PDa to PDd are arranged in a pupil-division direction in the imaging range of the single micro lens Le, and the four photodiodes PDa to PDd are divided in to four, namely top, bottom, left, and right, so that it is possible to detect phase difference in the horizontal direction and vertical direction. The four photo diodes PD are respectively arranged at upper left, lower left, upper right, and lower right positions. Specifically, a single pixel has four photodiodes PDa, PDb, PDc and PDd, and there are two pupil-division directions, namely the horizontal direction and the vertical direction.

Figure 14:
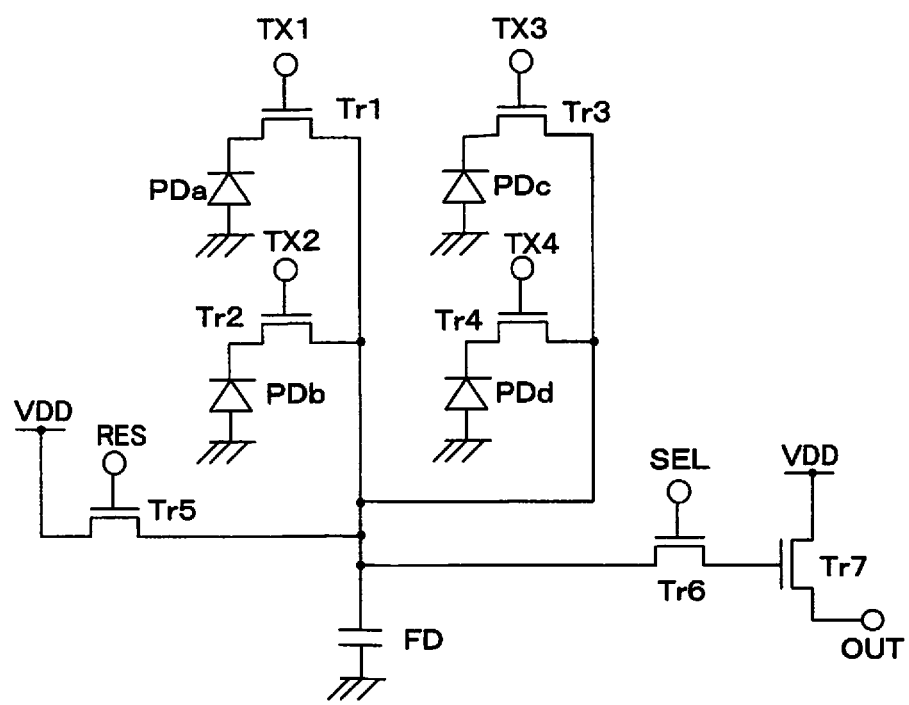
FIG. 14 is a circuit diagram showing structure of a 4PD pixel, in one embodiment of the present invention.

In a case where outputs of photodiodes PD are subjected to vertical 2PD addition, namely, in a case where (PDa+PDb) and (PDc+PDd) in FIG. 3A are generated, this will constitute focus detection pixel signals for detecting phase difference in the horizontal direction (vertical line detection). As shown at the upper right of FIG. 3A, a left side 2PD addition value L and a right side 2PD addition value R are obtained. Also, in a case where outputs of photodiodes PD are subjected to horizontal 2PD addition, namely, in a case where (PDa+PDc) and (PDb+PDd) are generated, this will constitute focus detection pixel signals for detecting phase difference in the vertical direction (horizontal line detection). As shown at the lower right of FIG. 3A, an upper 2PD addition value T and a lower 2PD addition value L are obtained. Also, in the case where outputs of photodiodes PD are subjected to 4PD addition, namely in a case where (PDa+PDb+PDc+PDd) is generated, a pixel signal of 4PD addition constitutes an image pixel signal A 4PD pixel structure and PD addition will be described using the circuit diagram shown in FIG. 14. Switching transistors Tr1-Tr4 are respectively connected to the four photodiodes PDa-PDd. If control signals TX1-TX4 from the vertical scanning section 21 are respectively applied to the switching transistors Tr1-Tr4, the transistors Tr1-Tr4 are selectively turned on. If the switching transistors Tr1-Tr4 are turned on, the photodiodes PDa to PDd and a floating diffusion FD are connected, and signal charge of a photodiode PD corresponding to a transistor Tr that has been turned on is transferred to the floating diffusion FD. For example, it is possible to transfer a signal charge resulting from addition of signal charges for PDa and PDb to the FD by turning on Tr1 and Tr2.

Also, one end of a switching transistor Tr5 connected to a point of connection of the switching transistors Tr1-Tr4 and the floating diffusion FD, with the other end of the transistor Tr5 being connected to a power supply voltage VDD. If a reset signal RES is applied to Tr5, the power supply voltage VDD and the FD are connected to reset the FD. By turning the switching transistor Tr5 on in a state where the switching transistors Tr1 to Tr4 are on, reset of the photodiodes PDa to PDd is performed. The floating diffusion FD is connected to an output terminal OUT via a switching transistor Tr6, and an amplifying transistor Tr7 that is connected to the power supply voltage VDD. If a selection signal SEL is applied to the switching transistor Tr6, a voltage value of the floating diffusion FD is amplified by transistor Tr7, and output to the output OUT, and this output voltage is input to the analog processing section 23.

Also, although described in detail using FIG. 4A and FIG. 4B, a first boundary B2 (corresponding to the barrier Ptb in FIG. 4A) exists between the pair of photodiodes PDa and PDb, and between the pair of photodiodes PDc and PDd, and a second boundary B1 (corresponding to the barrier Prl in FIG. 4A) exists between the pair of photodiodes PDa and PDc, and between the pair of photodiodes PDb and PDd. A potential barrier of this second boundary B1 is set so as to become higher compared to the potential barrier of the first boundary B2.

Next, setting of the potential barrier of a 4PD pixel will be described using FIG. 4A and FIG. 4B. Height of a potential barrier between light receiving sections (PD) is made different depending on the plurality of phase difference detection directions, but since an R/L pixel has a better readout efficiency than a T/B pixel, with this embodiment the R/L pixel is used with priority.

FIG. 4A shows height of a potential barrier (hereafter simply called barrier) between a pixel and a light receiving section PD in the case of RL pixel priority. In FIG. 4A, LT and LB respectively represent an upper left light receiving section LT (PDa), and a lower right light receiving section LB (PDb), while RT and RB respectively represent an upper right light receiving section RT (PDc) and a lower right light receiving section RB (PDd). As was described using FIG. 3A, in a case where detection direction of phase difference is arrow A (also called RL direction), it is possible to generate an L pixel signal by adding electrical charges of LT and LB, and it is possible to generate an R pixel signal by adding electrical charges of RT and RB. In the case of R/L pixel priority, level of a barrier Ptb (corresponding to boundary B2) that is positioned between LT and LB, and positioned between RT and RB is set so as to become low with respect to level of a barrier Prl (corresponding to boundary B1) that is positioned between LT and RT, and positioned between LB and RB.

In this way, since level of barrier Ptb is set so as to become low with respect to the level of barrier Prl, incident light amount on to LT becomes larger than for other light receiving sections, for example, and there may be cases where an electrical charge that has been accumulated exceeds the barrier Ptb and spills over. In this case, this electrical charge that has spilled over flows into LB. A case where electrical charge exceeds the barrier and spills over in this way is known as saturation. Electrical charge that has been generated in the L pixel (LT+LB) is limited to the barrier Prl, and there is no flowing out of electrical charge into the R pixel (RT+RB). As a result of this, in a case where phase difference is detected in phase difference direction A, saturation of electrical charge does not occur in either of the R pixel (RT+RB) or L pixel (LT+LB), even if saturation of electrical charge occurs in any one of the light receiving sections LT, LB, RT, RB with respect to the barrier Ptb. Accordingly, since there is no saturation with respective pixel values of R pixels and L pixels (pixel output voltage), it is possible to detect phase difference for the phase difference direction A. Next, description will be given of the effect of having priority, compared to a case where there is no priority relating to barriers.

In a case where there is no priority relating to the barrier, as shown in FIG. 4B, specifically when level of the barrier Pa is equal in the RL direction and the TB direction, then in the event that any one of the light receiving sections LT, LB, RT, and RB has an accumulated electrical charge that is saturated and exceeds the barrier Pa, causing spillover of electrical charge, a balance of electrical charge amount collapses for both the RL direction phase difference and the TB direction phase difference, and phase difference detection becomes impossible. In order to avoid this type of electrical charge saturation, it is necessary to adjust accumulation time by monitoring accumulated charge amount. With the image sensor 208 electrical charge that has been accumulated in a PD is transferred to a capacitance (floating diffusion), and converted to a voltage to be read out as a signal voltage. This capacitance is set to a capacitance value that has been optimized as an image pixel signal, which is a 4PD addition pixel signal. If a voltage signal corresponding to charge saturation of a 4PD addition pixel signal is made 1, then a voltage signal corresponding to charge saturation of the light receiving sections LT, LR, RT and RB becomes 1/4.

Therefore, a 1PD pixel signal is set to a threshold voltage level corresponding to a charge amount corresponding to level of a 1PD barrier Pa, namely set to a threshold voltage level of 1/4 of the threshold voltage level corresponding to charge saturation of a 4PD addition pixel signal, and it is necessary to control accumulation time so that this threshold voltage level is not exceeded. In a case where there is not this type of priority with levels of barriers Pa made equal, as a threshold voltage level it is necessary to make a value of 1/4 of a threshold voltage level for a 4PD addition pixel signal an electrical charge saturation determination level. The same applies in the case of a 2PD addition pixel signal, and in order to determine saturation of electrical charge for 1PD it is necessary to make a value of 1/4 of a threshold voltage level of a 4PD addition pixel signal a charge saturation determination level. Accordingly, in a case where there is no priority for barriers, a dynamic range of signal voltage of phase difference detection pixels (R/L pixels, T/B pixels) is reduced to 1/4 of the dynamic range of signal voltage of image pixels (4PD addition), and there is a problem in that precision of phase difference detection is lowered.

On the other hand, if there is priority with respect to barriers, such as the RL pixel priority that has been described above, in a case where R/L pixels are read out, if electrical charge amount for 2PDs LT and LB does not exceed barrier Prl, then even if electrical charge amount of a single PD LT (or LB) among the 4PD exceeds barrier Ptb respective signal voltages of the R/L pixels will not be saturated. In a case where level of a barrier Prl between R/L pixels is made the same as a barrier Pa for the case where there is no priority, an electrical charge amount for 2PDs (LT and LB, or RT and RB) corresponding to the level of the barrier Pa for the R/L pixels becomes 1/2 the electrical charge amount for 4PD addition corresponding to the level of the barrier Pa. Accordingly, for the signal voltage of the R/L pixels it is possible to set an electrical charge saturation determination level to 1/2 of the electrical charge saturation determination level for the signal voltage for 4PD addition. As a result of this, it is possible to make the dynamic range of the signal voltage for RL direction phase difference detection pixels (R/L pixels) 1/2 of the dynamic range of the signal voltage of image pixels (4PD addition). It is possible to enlarge the dynamic range by two compared to the case where there is no priority. It should be noted that setting of a potential barrier can be performed by adjusting impurity concentration of a semiconductor in a manufacturing process of the image sensor, and detailed description is omitted.

Next, a method of setting saturation determination level for pixel data will be described based on setting of barrier level that was described using FIG. 4A. In the case of reading out pixel data for R/L pixels with RL pixel priority, the saturation determination level is set to a voltage level corresponding to level of a barrier Prl between the R pixels and L pixels, as was described previously. Generally, level of the barrier Prl is set to 70% of the saturation level for electrical charge of 4PD addition pixels, in order to ensure linearity of the 4 PD addition pixel. In a case where saturation level for signal voltage in a case of reading out a pixel signal for a 4PD addition pixel is made, for example, 4096 (corresponding to 12 bit quantization), saturation level for signal voltages of R/L pixels corresponds to signal voltage corresponding to electrical charge amount for 2 respective PDs, which is 4096×70%/2=1433. Accordingly, saturation determination level for signal voltage of R/L pixels (pixel data) may be set to, for example, about 1300 (refer to S9 in FIG. 9A, and S27 in FIG. 9B).

In a case of reading out pixel data for T/B pixels, the saturation determination level is set to a voltage level corresponding to the level of a barrier Ptb between T pixels and B pixels. Level of the barrier Ptb is set to 70% of the level of the barrier Prl. In a case where saturation level for signal voltage in a case of reading out a pixel signal for a 4PD addition pixel is made 4096, saturation level for signal voltages of T/B pixels corresponds to 4096×70%×70%/4=501, which is signal voltage corresponding to electrical charge amount for 2 respective PDs. Accordingly, saturation determination level for signal voltage of T/B pixels (pixel data) may be set to, for example, about 450 (refer to S13 in FIG. 9A, and S31 in FIG. 9B).

On the other hand, in the case where RL pixel priority is not set, if saturation of electrical charge occurs for any one of the four PDs there will be imbalance, which will have an effect on correlation calculation. In this case, under the same conditions, saturation level for signal voltage of R/L pixels will become 4096×70%/4=716. Accordingly, by setting RL pixel priority it is possible to ensure dynamic range of about double (1433/716) for signal voltage of R/L pixels (pixel data), and the effect of this is significant.

In a frame in which the phase difference detection shown in FIG. 8, which will be described later, is performed, saturation is determined by setting a saturation determination level for R/L pixels in the case of exposure/readout of R/L pixel signals, and setting a saturation determination level for T/B pixels in a case of exposure/readout of T/B pixel signals (refer, for example, to S9 to S15 in FIG. 9A, and S27 to S33 in FIG. 9B).

Figure 5:
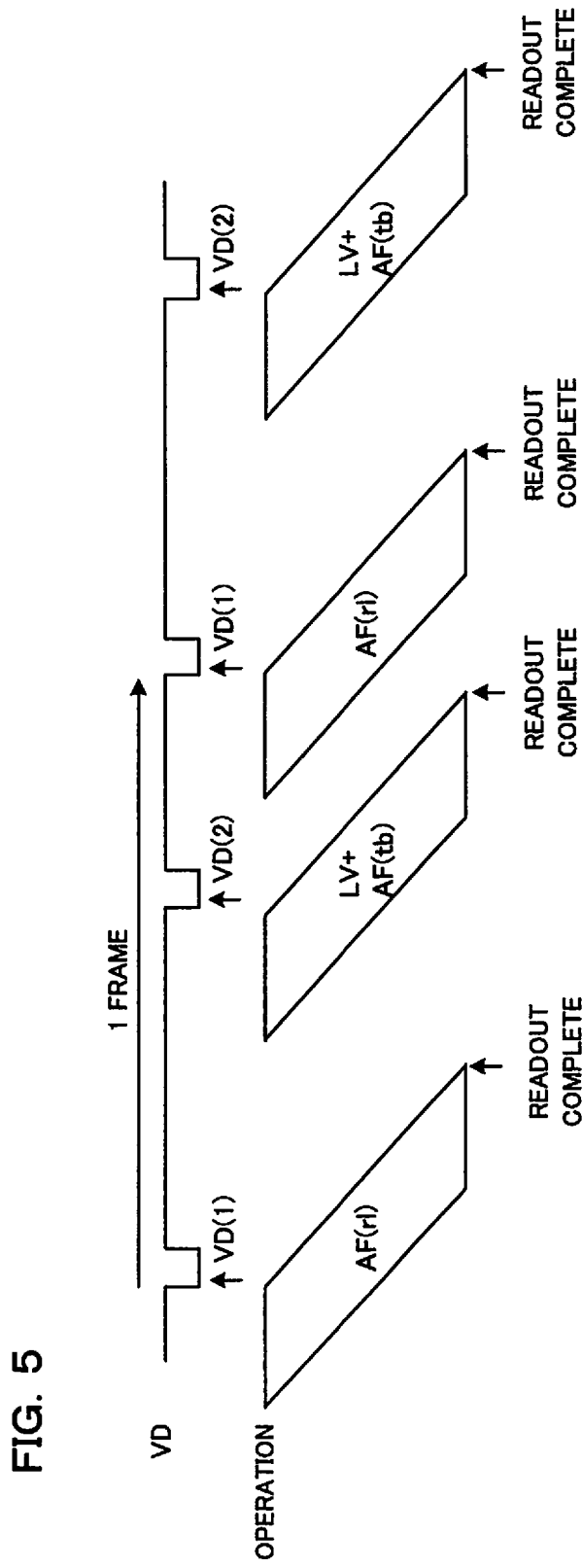
FIG. 5 is a drawing showing sequences at the time of AF and at the time of LV, in the imaging device of one embodiment of the present invention.

FIG. 5 is a timing chart for describing exposure and readout processing for AF and LV (live view) (refer, for example, to S5 in FIG. 9A and S23 in FIG. 9B). "VD" represents timing of a synchronization signal (vertical synchronization signal) input to the element control section 29. VD(1) is a vertical synchronization signal indicating timing of an AF operation that includes imaging and readout for AF, and VD(2) is a vertical synchronization signal indicating timing of an LV operation that includes imaging and readout for LV. VD(1) and VD(2) are input once at a time to the element control section 29 between single frames, and processing for exposure and readout for AF and LV is performed for every one frame. Length of one frame is determined in accordance with update interval of a screen of an LV display.

In FIG. 5, an AF operation shown by AF (rl) is an operation for generating and reading out focus detection pixel signals relating to a first pupil-division direction. The first pupil-division direction is the horizontal direction of the pixel section 22 (RL direction), for example. Before an AF operation the element control section 29 switches settings of the pixel section 22 so that R/L pixel signals, which are a left opening pixel signal l (Rl, Grl, Gbl, Bl) and a right opening pixel signal (Rr, Grr, Gbr, Br), are output from the pixel section 22. The element control section 29 performs setting for pixel addition, for adding (averaging) a plurality of R/L pixel signals for the same color and same opening that are output from the pixel section 22, in order to shorten pixel signal readout time. This pixel addition (averaging) is performed by the analog processing section 23.

Next, pixel addition (averaging) of R/L pixels for horizontal phase difference detection, that have been read out from the pixel section 22 in an AF (rl) operation, will be described using FIG. 6. The upper drawing in FIG. 6 shows an image of arrangement corresponding to each pixel. Rl positioned at (m1, n1) means a left side opening red pixel (R), and Rr positioned at (m2, n1) means a right side opening red pixel (R). Gbl positioned at (m1, n2) means a left side opening green pixel (Gb), and Gbr positioned at (m2, n2) means a right side opening green pixel (Gb). "B" means a blue pixel.

Pixel addition for R/L pixels is set such that in the analog processing section 23 addition of only vertical direction pixels, which is a second pupil-division direction, is performed, without performing addition for the horizontal direction, which is the first pupil-division direction. For the horizontal direction setting is performed such that pixel signals for the same openings (associated left openings or associated right openings) are subjected to 1/1 pixel addition (no addition), and in the vertical direction setting is performed so that pixel signals for the same openings (associated left openings or associated right openings) are subjected to 5/9 pixel addition. 5/9 pixel addition means adding of 5 pixels Rl corresponding to n1 to n9, and the addition of 5 pixels Gbl corresponding to n2 to n10, among 9 pixels in the vertical direction (with the example of m1 in FIG. 6, 9 respective pixels for Rl corresponding to n1 to n17, and for Gbl corresponding to n2 to n18). A number of additions of pixel signals may be set appropriately in accordance with frame rate, for example. A number of rows of pixel signals is decreased by compressing a number of rows of pixel signals as a result of this setting, and pixel signal readout time is shortened. On the other hand, detection precision of phase difference in the horizontal direction is ensured since number of columns of pixel signals is not compressed.

After the CPU 212 has output control signals to the image sensor 208 (element control section 29) and set pixel addition mode, as shown in FIG. 6, control signals are output to the image sensor 208 (element control section 29) so as to perform imaging with an exposure time required to generate focus detection pixel signals. This exposure time is set based on subject brightness and saturation state of pixel data etc.

The element control section 29 receives input of control signals from the CPU 212 and commences imaging (electrical charge accumulation) for every line of the pixel section 22, and controls the vertical scanning section 21 to sequentially output RL pixel signals from the pixel section 22 for lines for which imaging has been completed.

In order to increase speed and reduce power consumption, detection of horizontal direction phase difference is performed using, as R/L pixel signals, a pair made up of Gr left side opening pixel signal Grl and right side opening pixel signal Grr, and a pair made up of Gb left side opening pixel signal Gbl and right side opening pixel signal Gbr. It is not always necessary to read out a pair made up of R left side opening pixel signal Rl and right side opening pixel signal Rr, and a pair made up of B left side opening pixel signal Bl and right side opening pixel signal Br. At the time of readout, only pairs of Grl and Grr, and pairs of Gbl and Gbr, may be read out, as shown in the lower drawing of FIG. 6.

The lower drawing in FIG. 6 in a conceptual diagram of data arrangement of a memory section 25 for pixel data that has been subjected to A/D conversion after pixel addition. Addition values Gr_L for lines of left side opening Grl pixels n1, n3, n5, n7, n9 of column m3 in the upper drawing of FIG. 6 (in FIG. 6, in order to reduce space, pixels are described only as "Gr") are arranged in column m1 in the lower drawing of FIG. 6, and addition values Gr_R of right side opening Grr pixels n1, n3, n5, n7, n9 of column m4 in the upper drawing of FIG. 6 (in FIG. 6, in order to reduce space, pixels are described only as "Gr") are arranged in column m2. Also, similarly, addition values Gb_L for lines of left side opening Gbl pixels n2, n4, n6, n8, n10 of column m1 in the upper drawing of FIG. 6 (in FIG. 6, in order to reduce space, pixels are described only as "Gb") are arranged in column m1 in the lower drawing of FIG. 6, and addition values Gb_R of right side opening Gbr pixels n2, n4, n6, n8, n10 of column m2 in the upper drawing of FIG. 6 (in FIG. 6, in order to reduce space, pixels are described only as "Gb") are arranged in column m2. As shown in the lower drawing of FIG. 6, other added pixel data is similarly arranged.

In this way, for each line, addition values Gr_L, Gr_R, Gb_L and Gb_R for 5 pixels of Grl and Grr pixels, or Gbl and Gbr pixels, are stored in the memory section 25 as R/L pixel signals, in the format shown in the table in the lower drawing of FIG. 6. The image sensor 208 outputs these addition values Gr_L and Gr_R, and Gb_L and Gb_R as R/L pixel signals, and correlation calculation etc., which will be described later, is performed in the focus detection circuit 218 using this pixel data. The pair of Rl and Rr, and the pair of Bl and Br, may both be read out together.

Here, processing associated with inside the image sensor 208 will be described. R/L pixel signals that have read out from the pixel section 22 are subjected to analog processing such as CDS and gain processing, pixel addition processing etc. in the analog processing section 23. R/L pixel signals after pixel addition that have been subjected to analog processing are converted to R/L pixel data after pixel addition, which are digital signals in the ADC processing section 24, and stored in the memory section 25. The horizontal scanning section 26 receives control signals from the element control section 29 and transfers R/L pixel data after pixel addition (the lower drawing in FIG. 6) that are stored in the memory section 25 to the output section 27 in order of columns.

The output section 27 generates pixel data lines by arranging pixel data that has been transferred by the horizontal scanning section 26 into lines, and converts the pixel data lines that have been generated to a specified output signal format, such as a serial signal or a differential signal, and outputs the result. These pixel data lines are stored in the DRAM 226 in order of arrangement, such as shown in the lower drawing of FIG. 6, as R/L pixel data after pixel addition (focus detection pixel data rl). It should be noted that pixel addition has been described as being executed in the analog processing section 23, but pixel addition may also be executed in the ADC processing section 24 or the memory section 25 without performing pixel addiction in the analog processing section 23.

Next, description will be given of data processing for AF, associated with an AF (rl) operation. Pixel data lines that have been stored in the DRAM 226 as a result of a readout operation by the AF (rl) operation (R/L pixel data after pixel addition) are used in correlation calculation for the purpose of focus deviation amount calculation. The focus detection circuit 218 performs correlation calculation using pairs of Grl and Grr, and pairs of Gbl and Gbr, which are R/L pixel data after pixel addition stored in the DRAM 226 (focus detection pixel data rl shown in the lower drawing of FIG. 6).

Next, description will be given of the live view (LV) operation shown in FIG. 5 described above. The LV operation shown as LV+AF (tb) is mainly an operation for generating and reading out a display pixel signal, but generation and readout of a focus detection pixel signals relating to the second pupil-division direction in the LV operation is also performed. Before an LV operation, in accordance with instructions from the CPU 212 the element control section 29 switches settings of the pixel section 22 so that upper opening pixel signals t (Rt, Grt, Gbt, Bt) and lower opening signals b (Rb, Grb, Gbb, Bb), that are T/B pixel signals from the pixel section 22, are output. Also, the element control section 29 performs setting for pixel addition of T/B pixel signals that are output from the pixel section 22 in order to shorten readout time of pixel signals.

Figure 7:
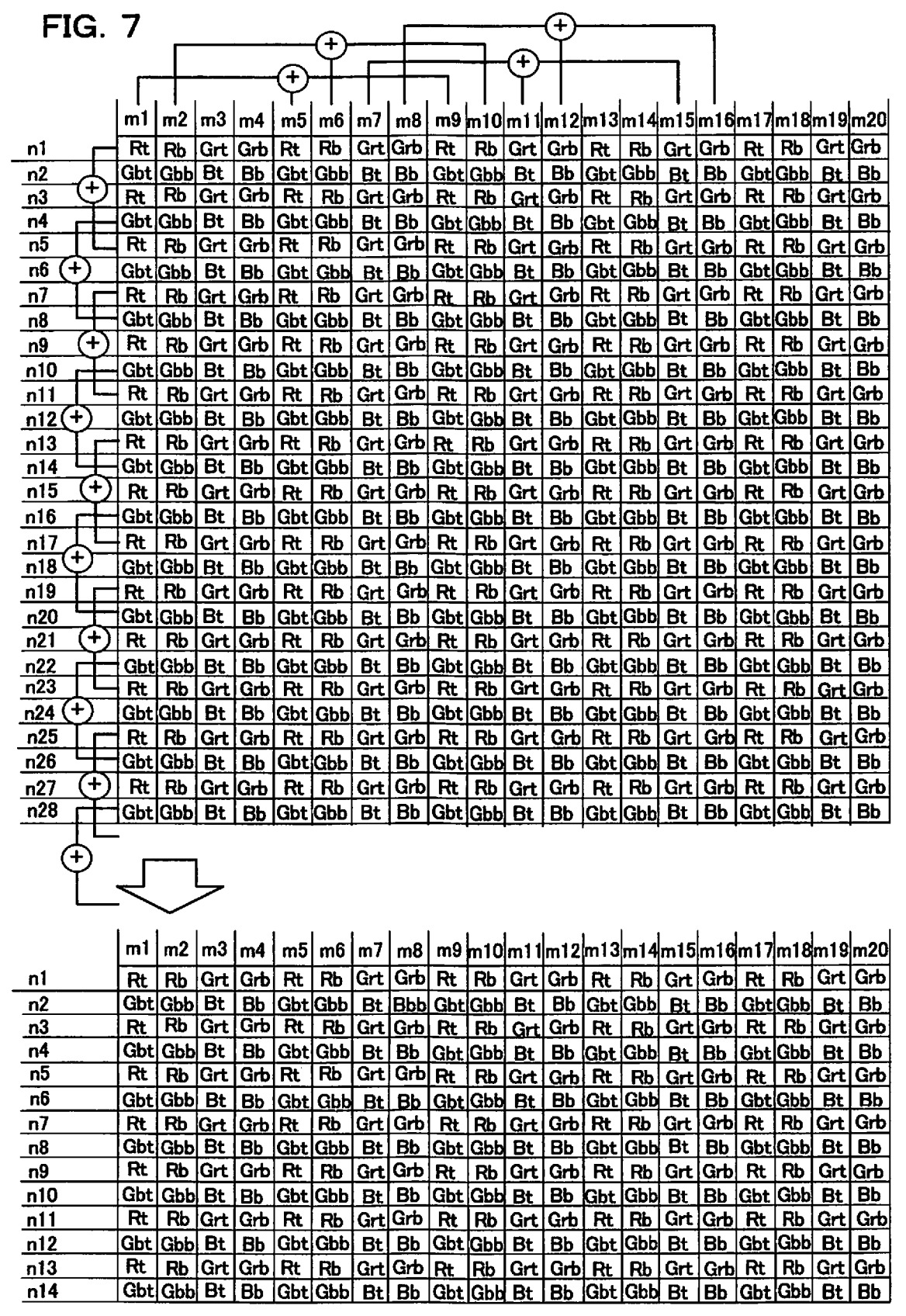

Next, description will be given of pixel addition (averaging) in the LV operation, using FIG. 7. With an LV operation, setting is made such that pixel addition is performed in both a horizontal direction, being a first pupil-division direction, and a vertical direction, being a second pupil-division direction. FIG. 7 is a conceptual diagram of a similar arrangement to FIG. 6, but with left and right arrangement of T pixel signals and B pixel signals, and not vertical arrangement.

In the upper drawing of FIG. 7, setting is performed so that pixel signals (associated T pixel signals or associated B pixel signals) of three of the same openings aligned in a horizontal direction (associated upper openings or associated lower openings) are added, and pixel signals (associated T pixel signals or associated B pixel signals) of two of the same openings aligned in a vertical direction (associated upper openings or associated lower openings) are added.

2/3 pixel addition in the vertical direction is addition of 2 pixels from among 3 pixels of the same color in the vertical direction, and with column m1 in FIG. 7 is addition of two pixels n1 and n5 among three pixels for Rt corresponding to n1 to n5, and addition of two pixels n4 and n8 among three pixels for Gbt corresponding to n4 to n8. 3/3 pixel addition in the horizontal direction is addition of three pixels of the same color that are adjacent in the horizontal direction, and with column n1 in FIG. 7 is addition of three adjacent Rt pixels of m1, m5, and m9 (adjacent Rb pixels of m2, m6 and m10). Also, three adjacent Grt pixels m7, m11 and m15 (adjacent Grb pixels m8, m12 and m16) are added.

In detecting phase difference in the vertical direction, a number of added pixels in the vertical direction is made two pixels in order to ensure detection resolution in the vertical direction. Although it is possible to further improve detection resolution by doing away with pixel addition in the vertical direction, a number of lines read out is increased and readout speed is lowered (readout efficiency is low), and so 2/3 pixel addition is set, number of lines read out is decreased to 1/3, and readout time is shortened. In FIG. 7, it is shown that addition is not performed for the second line and the third and fourth columns, but this arises simply because a number of lines and a number of columns of the pixel section 22 are not multiples of three.

After the CPU 212 has transmitted control signals to the image sensor 208 (element control section 29) and set pixel addition mode, as shown in FIG. 7, control signals are output to the image sensor 208 (element control section 29) so as to perform imaging with an exposure time required to generate focus detection pixel signals. This exposure time is set based on subject brightness and saturation state of pixel data etc.

Here, processing associated with an LV operation within the image sensor 208 will be described. The element control section 29 receives input of control signals from the CPU 212 and commences imaging (electrical charge accumulation) for every line of the pixel section 22, and controls the vertical scanning section 21 to sequentially output T/B pixel signals from the pixel section 22 for lines for which imaging has been completed. T/B pixel signals that have been read out from the pixel section 22 are subjected to analog processing in the analog processing section 23, converted to T/B pixel data after pixel addition, which are digital signals, in the ADC processing section 24, and stored in the memory section 25 in an arrangement as shown in the lower drawing in FIG. 7, as T/B pixel signals after pixel addition.

With the LV operation, in order to generate display image data, pixel data for R, Gr, Gb and B is required, and upper opening pixel data (T pixel data) Rt, Grt, Gbt and Bt, and lower opening pixel data (B pixel data) Rb, Grb, Gbb and Bb are stored in the memory section 25. The horizontal scanning section 26 receives control signals from the element control section 29 and transfers T/B pixel data after pixel addition that are stored in the memory section 25 to the output section 27 in order of columns. The output section 27 generates pixel data lines by arranging T/B pixel data after pixel addition that has been transferred by the horizontal scanning section 26 into lines, and converts the pixel data lines that have been generated to a specified output signal format such as a serial signal or a differential signal, and outputs the result.

These pixel data lines that have been output from the image sensor 208 are stored in the DRAM 226 as T/B pixel data after pixel addition (focus detection pixel data), in a format such as shown in the lower drawing of FIG. 7. It should be noted that the pixel addition in FIG. 7 has been described as being executed by the analog processing section 23, but the pixel addition may also be executed by the ADC processing section 24 and the memory section 25 instead of being executed by the analog processing section 23.

Next, description will be given of data processing for AF (tb) associated with an LV operation. Pixel data lines that have been stored in the DRAM 226 as a result of a readout operation by the LV operation (T/B pixel data after pixel addition) is used in correlation calculation for the purpose of focus deviation amount calculation. The focus detection circuit 218 performs correlation calculation using pairs of Grt and Grb, and pairs of Gbt and Gbb, which are T/B pixel data after pixel addition stored in the DRAM 226 (focus detection pixel data tb shown in the lower drawing of FIG. 7). Correlation calculation using pairs of Rt and Rb, and pairs of Bt and Bb may also be executed as required. Description will also be given of data processing for LV associated with the LV operation. For pixel data lines that have been stored in the DRAM 226 as a result of readout operation by the LV operation (T/B pixel data after pixel addition), T pixel data and B pixel data for the same color and same position are added by the image processing circuit 214, and image data for LV display having R, Gr, Gb, and B pixel data is generated. The CPU 212 performs LV display with the display section 222 using the image data for LV display.

Next, the actual exposure (still picture frame) and AF exposure (phase difference frame) in high speed rapid shooting mode will be described using FIG. 8. FIG. 8 shows operation executed during still picture rapid shooting using an electronic shutter, in rapid shooting mode and continuous AF (CAF) mode. For example, the user operates the operation section 206 to set the above-described modes. Also, in a state where a 2nd release switch has been turned on by the user, there is a rapid shooting operation with the mechanical shutter 202 in a fully open state. The imaging device of this embodiment is capable of continuous shooting of still pictures, based on an added signal resulting from having added output signals of all of a plurality of light receiving sections of the image sensor.

In FIG. 8, VD represents timing of a vertical synchronization signal for an imaging operation, and T1 to T13 in the horizontal axis direction represent times. At time T1 initial (still picture first frame) actual exposure (corresponding to still picture and live view SI & LV in FIG. 8) is commenced, at time T2 exposure for the first line is completed, and after that actual exposure for the second frame commences at time T4, actual exposure for the third frame commences at time T7, and actual exposure for the fourth frame commences at time T10.

In respective actual exposures, still picture image data of only image pixel signals is acquired by reading out 4PD addition values of pixel signals of photodiodes PDa to PDd of a 4PD pixel (refer to FIG. 3A), from the image sensor 208. This image data is processed and stored as still picture image data, together with processing as image data for live view display and execution of live view display.

Also, between one actual exposure and another actual exposure, pixel data of focus detection pixels for phase difference detection are read out. At time T3 exposure for initial (first frame) phase difference detection (corresponding to phase difference detection PDD in FIG. 8) is commenced, exposure for the first line is completed at time T4, and after that exposure for phase difference detection of the second frame commences at time T6, and exposure for phase difference detection of the third frame commences at time T9. In respective exposures for phase difference detection, added values PDa+PDb, PDc+PDd (for horizontal phase difference), which are R/L pixel signals of a pixel signal of 4PD divided photodiodes (refer to FIG. 3A), and added values PDa+PDc, PDb+PDd (for vertical phase difference), which are T/B pixel signals of photodiodes, are readout as image data for phase difference detection.

With this practical example, a potential barrier for RL pixel priority is set in the image sensor 208, and readout processing is performed with priority given to R/L pixel signals that have a larger dynamic range. That is, with exposure for phase difference detection focus detection calculation is performed by reading out only R/L pixel signals. Also, exposure control (accumulation time control) is performed so that data saturation is avoided, based on the R/L pixel signals, as will be described later. The AF (rl) operation shown in FIG. 5 described previously may also be executed as an exposure and readout operation for R/L pixel signals. By using only R/L pixel signals that have a wider dynamic range, it is possible to shorten the time for a phase difference detection exposure and readout operation, and to make a focus detection operation highly accurate, and a higher speed rapid shooting operation becomes possible.

Also, with each phase difference detection, exposure and readout of pixel signals for both horizontal phase difference and vertical phase difference may be continuously executed. Also, both the previously described AF (rl) operation, as exposure and readout of pixel signals for horizontal phase difference, and the previously described LV+AF (tb) operation, as exposure and readout of pixel signals for vertical phase difference, may be continuously executed. Also, exposure and readout may be performed by alternately switching between pixel signals for horizontal phase difference and vertical phase difference, such that the phase difference detection exposure between time T3 and time T4 performs exposure and readout of pixel signals for horizontal phase difference, while the phase difference detection exposure between time T6 and time T7 performs exposure and readout of pixel signals for vertical phase difference. Also, exposure and readout for horizontal phase difference and vertical phase difference may be set for every pixel, and exposure and readout may be executed simultaneously for both pixel signals in one frame. In this way image data for phase difference detection is acquired.

The camera body 200 performs communication by outputting a lens synchronization signal, for synchronizing to imaging synchronization signal VD, to the interchangeable lens 100. This lens synchronization signal may have period aligned with the imaging synchronization signal VD, and may have a period that is double the imaging synchronization signal VD, as shown in FIG. 8. With this example, VD is output at times T1, T2, T4, T5, T7, T8, T10, T11 and T13. On the other hand, the lens synchronization signal is output at times t1, t4, t7, t10 and t13, and has double the period of VD. It should be noted that as well as having the same period as VD, and double the period of VD, the lens synchronization signal may also have another period. Phase of the lens synchronization signal may coincide completely with the phase of the imaging synchronization signal VD, as shown in FIG. 8, or may be displaced.

The camera body 200 transmits focus lens drive amount (direction), that has been calculated based on results of phase difference detection, to the lens 100 in synchronism with the lens synchronization signal. For example, the camera body 200 (CPU 212) calculates focus lens drive amount (direction) based on results of phase difference detection for VD of T3 to T4, and after transmission of lens synchronization signal t4 to the lens 100 transmits the focus lens drive amount (direction). The lens CPU 106 drives the focus lens based on the focus lens drive amount (direction) that has been received.

Figure 9C:
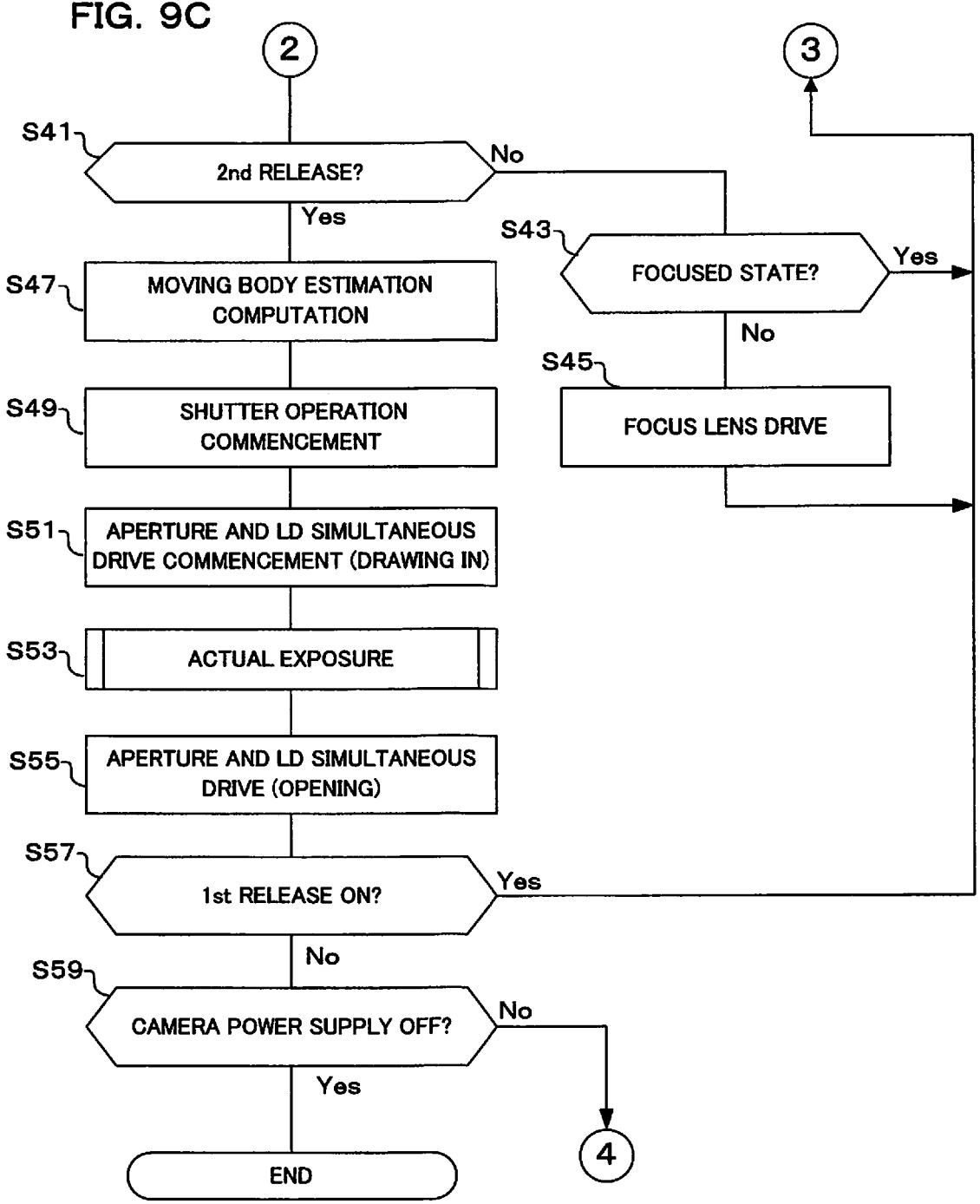

Next, description will be given for operation of the imaging device that includes the focus detection device, using the flowcharts shown in FIG. 9A to FIG. 9C. This flow shows operation when AF mode of the imaging device 1 has been set to continuous AF, and low speed rapid shooting mode, which is a rapid shooting mode different to that in FIG. 8, and in which still picture shooting (actual exposure) is performed using a mechanical shutter, has been set. Continuous AF mode is an AF mode that is suitable for a moving subject, and is an AF mode in which focusing is performed continuously so as to track a subject. For example, the user operates the operation section 206 to set the above-described modes. This flowchart is realized by the CPU 212 within the camera body 200 controlling each section within the camera body 200 and the interchangeable lens 100 in accordance with programs that have been stored in the body side storage section 228.

If it is detected that the user has performed an ON operation of the power supply of the imaging device 1, the flow for camera power supply ON shown in FIG. 9A is commenced. If the power supply ON operation is detected, it is first determined whether or not a 1st release switch is on (S1). Here, the CPU 212 determines whether or not a 1st release switch of a release button within the operation section 206 is in an on state. If the user focuses on a subject and decides on exposure, the release button is pressed down halfway. If the user performs a half-press operation of the release button, the 1st release switch enters an on state in response to this operation.

If the result of determination in step S1 is that the 1st release switch is not on, live view (LV) exposure and readout is performed (S3). Here, the CPU 212 outputs a control signal to the drive section 204 so as to put the mechanical shutter 202 in a fully-open state, as well as outputting a control signal to the lens CPU 106 so as to move the aperture 102b by a given amount (for example, open aperture wider). After that, the CPU 212 outputs control signals for the image sensor 208 every predetermined time (time determined by display frame rate), and performs imaging for LV display using the image sensor 208. Every time imaging for LV display is completed, the element control section 29 reads out pixel signals from the pixel section 22. It should be noted that at the time of pixel signal readout, the element control section 29 adds pixel signals of the same opening (same color) output from the pixel section 22, and outputs the resulting signal. Pixel data that has been output from the image sensor 208 is stored in the DRAM 226 as data for display.

If the pixel data for display has been stored in step S3, the CPU 212 next performs live view (LV) display, and generates display image data in the image processing circuit 214. The image processing circuit 214 performs necessary processing on the pixel data that has been read out from the image sensor 208, to generate display image data for display. Display image data is obtained by additive averaging of pixel data of photodiodes PDa to PDd that belong to the same pixel section 22 (micro lens). This additive averaging processing is not limited to being executed in the image processing circuit 214, and may also be executed within the image sensor 208. If the CPU 212 has performed LV display to display an LV image on the display section 222 based on display image data that has been generated by the image processing circuit 214, S1 is returned to.

If the result of determination in step S1 is that the 1st release switch is on, exposure and readout for AF and LV are performed (S5). The CPU 212 performs the imaging and readout for autofocus (AF) and LV display that was described in FIG. 5. Imaging and readout for AF performs AF operation AF (rl), and imaging and readout for LV display performs LV operation (LV+AF (tb)). Focus detection pixel data rl, tb that was calculated in step S5 is stored in DRAM 226, and is used at the time of correlation calculation using a phase difference method. Also, the image processing circuit 214 generates pixel data for display by adding data constituting pairs of focus detection pixels data tb that has been stored in the DRAM 226, and this pixel data for display that has been generated is stored in DRAM 226. The CPU 212 performs live view display based on the pixel data for display that has been stored in the DRAM 226.

Next, correlation calculation and reliability determination are performed (S7). Here, the CPU 212 executes focus detection calculation using the focus detection circuit 218. The focus detection circuit 218 performs correlation calculation using focus detection pixel data rl, tb that constitute a pair, that is stored in the DRAM 226. Correlation calculation is the respective generation of two-image interval values corresponding to phase difference, for AF areas, based on focus detection pixel data within a plurality of AF areas (focus detection regions). Once correlation calculation is completed, the focus detection circuit 218 performs reliability determination for focus detection. Reliability determination is determination based on reliability evaluation value corresponding to contrast of a subject image acquired from pixel data, and a plurality of correlation values calculated as results of correlation calculation.

If reliability determination has been performed, next saturation detection for R/L pixel data is performed (S9). It is detected whether or not R/L pixel data that was read out as focus detection pixel data in AF exposure and readout (AF (rl)) is saturated. Comparison of pixel data and a specified threshold value TH that has been set for R/L pixels (as one example of saturation determination level, 1300) is performed, and if the pixel data is larger than the specified threshold value (corresponding to signal amount being long) it is determined that the pixel data is saturated.

If the result of determination in step S9 is that the R/L pixel data is saturated, an exposure correction amount Tv_RL+ is set to 1 (S11). The exposure correction amount Tv_RL+ that has been set is used in correction of exposure time with the AF&LV exposure and readout of step S5 the next time (FIG. 5: AF (rl)). Exposure time corresponding to the next R/L pixels is set to the exposure time that has been increased by 1 Ev (exposure time of 1/2), and exposure control is performed so that there is no saturation. In one example, 1 Ev may be a change amount of 0.5 Ev or 2 Ev. Also, positions of R/L pixels for which it has been detected that pixel data is saturated are stored in DRAM 226. Position information on these data saturated pixel is used in order to determine in which focus detection region of a plurality of focus detection regions data saturated pixels are contained (area selection of step S17). In this way, exposure time is set so that R/L pixel data is not saturated, and the saturation determination level (threshold value TH) is also called charge storage determination level as it is used as a target accumulation level.

If exposure correction amount has been set in step S11, or if the result of determination in step S9 was that saturation of R/L pixel data was not detected, saturation detection for T/B pixel data is performed (S13). In an LV operation (LV+AF (tb)), it is detected whether or not T/B pixel data that has been read out as focus detection pixel data is saturated. Comparison of pixel data and a specified threshold value TH that has been set for T/B pixels (as one example of saturation determination level, 450) is performed, and if the pixel data is larger than the specified threshold value (corresponding to signal amount being large) it is determined that the pixel data is saturated.

If the result of determination in step S13 is that the T/B pixel data is saturated, an exposure correction amount Tv_TB+ is set to 1 (S15). The exposure correction amount Tv_TB+ that has been set is used in correction of exposure time with the AF&LV exposure and readout of step S5 the next time (FIG. 5: LV+AF (tb)). That is, exposure time corresponding to the next T/B pixels is set to an exposure time that has been increased by 1 Ev (exposure time of 1/2), and exposure control is performed so that there is no saturation. In one example, 1 Ev may be a change amount of 0.5 Ev or 2 Ev. Also, positions of T/B pixels for which it has been detected that pixel data is saturated are stored in DRAM 226. Position information on these data saturated pixels is used in order to determine in which focus detection region of a plurality of focus detection regions data saturated pixels are contained (area selection of step S17). In this way, exposure time is set so that T/B pixel data is not saturated, and the saturation determination level (threshold value TH) is also called charge storage determination level when used as an accumulation level that is made a target.

If exposure correction amount has been set in step S15, or if the result of determination in step S13 was that saturation of T/B pixel data was not detected, then next, area selection is performed (S17). Here, the focus detection circuit 218 calculates focus deviation amount (defocus amount) of the focus lens 102a using a two-image interval value of a focus detection region that was determined to have high reliability as a result of reliability determination, and selects a focus detection region (and corresponding defocus amount) based on this focus deviation amount. For example, a focus detection region exhibiting a defocus amount corresponding to the closest subject distance (closest range) is selected. Area selection processing is not limited to the closest subject, and it is also possible to select an area in which a person's face exists, and it is also possible have an area that has been selected manually by the user. It should be noted that area selection may also be performed by the CPU 212. In the area selection, focus detection regions that contain a specified number or more of either R/L pixels or T/B pixels for which data saturation has been detected are made invalid and removed from targets of area selection. This is because focus detection calculation that includes pixels for which data saturation has been detected will lower detection precision. The specified number is appropriately changed in accordance with conditions that have been set (such as a number of pixels constituting a focus detection region, for example).

If area selection has been performed, next, focused state is determined (S19). Here, the CPU 212 determines whether or not the focus lens 102a is in a focused state. Specifically, it is determined whether or not focus deviation amount of the focus detection region that was selected in the area selection processing is within a predetermined permissible range, and a focused state is determined if the focus deviation amount is within the permissible range.

If the result of determination in step S19 is not a focused state, focus lens drive is executed (S21). Here, the CPU 212 performs communication with the lens CPU 106 to output a control signal to the lens CPU 106 so as to drive the focus lens 102a to a focus lens position that was calculated for the focus detection region that was selected in step S17. Upon receiving this control signal, the lens CPU 106 drives the focus lens 102a by means of the drive section 104 to a position that has been instructed. Once the focus lens 102a has been driven processing returns to step S1.

If the result of determination in step S19 is a focused state, exposure and readout for AF & LV are performed (S23). Here, similarly to step S5, the CPU 212 performs imaging (exposure) and readout for autofocus (AF) and live view (LV) display. A pixel signal is read out from the image sensor 208, focus detection pixel data for AF is stored in the DRAM 226, and display pixel data for LV is stored in the DRAM 226. Also, live view (LV) display is performed using the display pixel data for LV.

Next, correlation calculation and reliability determination are performed (S25). Here, similarly to step S7, the CPU 212 causes execution of focus detection calculation by the focus detection circuit 218, using pixel data that was read out in step S23. The focus detection circuit 218 performs correlation calculation using focus detection pixel data that constitute a pair, that is stored in the DRAM 226. After correlation calculation, the focus detection circuit 218 performs reliability determination for focus detection.

If reliability determination has been performed, detection of whether or not R/L pixel data is saturated is performed (S27), and if the result of this determination is that the pixel data is saturated exposure correction amount Tv_RL+ is set to 1 (S29). If setting of exposure correction amount has been set, or if the result of determination in step S27 is that R/L pixel data is not saturated, next, determination of whether or not T/B pixel data is saturated is performed (S31), and if the result of this determination is that the T/B pixel data is saturated, exposure correction amount Tv_TB+ is set to 1 (S33). The processing in these steps S27-S33 is similar to the processing in steps S9-S15 described previously, and so detailed description is omitted.

If exposure correction amount has been set in step S33, or if the result of determination in step S31 was that T/B pixels were not saturated, then next, focus deviation amount is detected (S35), and area selection is performed (S37). In steps S35 and S37, similarly to step S17, the focus detection circuit 218 calculates focus deviation amount (defocus amount) of the focus lens 102a using a two-image interval value of a focus detection region that was determined to have high reliability at the time of the reliability determination of step S25, and selects a focus detection region (and corresponding defocus amount) based on this focus deviation amount. An example of focus detection region (area) is similar to that in step S17, and so detailed description is omitted.

Once area selection has been performed, next, history information is saved (S39). Here, the focus detection circuit 218 saves information relating to focus detection as history information in the DRAM 226, for example. Information relating to focus detection includes, for example, information on the focus deviation amount that was calculated in step S17, pixel data acquisition time, and information on the focus detection region that was selected. It should be noted that saving of history information may also be the CPU 212 saving information relating to focus detection in the DRAM 226.

Once history information has been saved, it is next determined whether or not the 2nd release switch is on (S41). Here, the CPU 212 determines whether or not the 2nd release switch within the operation section 206 has been turned on. The user presses the release button down fully in the case of shooting a still picture image for storage. If the user performs a full-press operation of the release button, the 2nd release switch enters an on state in response to this operation.

If the result of determination in step S41 is that the 2nd release switch is not on, it is next determined whether or not there is a focused state (S43). Here, processing similar to that in step S19 is performed, and if the result of determination is a focused state, processing returns to S23.

On the other hand, if the result of determination in step S43 is not a focused state, the focus lens is driven (S45). Here, similarly to step S21, the CPU 212 moves the focus lens 102a to an appropriate focus lens position based on the focus deviation amount. If focus lens drive has been performed, processing returns to step S23.

Returning to step S41 if the result of determination in this step is that the 2nd release switch is on, moving body estimation computation is performed (S47). Here, the CPU 212 causes execution of moving body estimation computation by the focus detection circuit 218. Moving body estimation computation is estimating a position where the focus lens 102a will be in focus for the current still picture exposure time, based on history of results of previous focus deviation amount calculation (focus lens position) and detection times that were stored in step S39.

If moving body estimation computation has been performed, next a shutter operation is commenced (S49). Here, the CPU 212 causes commencement of operation of the mechanical shutter 202 in order to perform imaging (actual exposure) for still picture acquisition for storage. This operation of the mechanical shutter 202 includes opening and closing operations of the mechanical shutter 202 before and after actual exposure, and a fully open operation of the mechanical shutter 202 after actual exposure for the purpose of imaging for live view and AF (in the flow of FIG. 9C, only the time of commencement of the shutter operation is described). If the shutter operation has commenced, the CPU 212 first switches control signals of the drive section 204 so as to put the mechanical shutter 202 in a fully closed state. Then, in step S53, during actual exposure the mechanical shutter 202 is temporarily closed fully after having been fully open. After that, the CPU 212 controls the drive section 204 so as to put the mechanical shutter 202 in a fully open state.

If the shutter operation has commenced, aperture drive of the aperture and focus lens drive (LD) are simultaneously commenced (S51). Here, the CPU 212 instructs the lens CPU 106 so as to drive the focus lens 102a and the aperture 102b at the same time, and both operations are commenced. Drive position for the focus lens 102a is a position that was estimated in the moving body estimation computation of step S47. Opening amount of the aperture 102b is an opening amount corresponding to the aperture value that has been calculated based on subject brightness that was measured as a result of previous photometry computation.

If aperture and focus lens drive have been performed, next, actual exposure is performed (S53). Here, the CPU 212 executes actual exposure, and, as was described previously, controls the drive section 204 so as to cause exposure for a predetermined exposure time using the mechanical shutter 202. Actual exposure is imaging to acquire image data for still picture storage, and with an exposure and readout operation pixels values resulting from having added outputs of four photodiodes for every pixel corresponding to a micro lens (4PD addition) are generated and output. After actual exposure is complete, the CPU 212 causes execution of an operation to read out pixel signals from the image sensor 208, after pixel signal readout causes processing for generation of still picture data for storage to be performed in the image processing circuit 214. The image processing circuit 214 generates still picture data for storage by performing necessary processing to generate image data for storage. After completion of image processing, the CPU 212 compresses the still picture data for storage using the image compression and expansion section 216. After completion of compression, the CPU 212 stores the still picture data for storage that has been compressed in the storage medium 230 as an image file.

Next, aperture and LD simultaneous drive (opening) is executed (S55). Here, the CPU 212 instructs the lens CPU 106 so as to open the aperture 102b, and so as to drive the focus lens 102a to a target position. In step S51, the focus lens 102a was driven to a position that was estimated by the moving body estimation computation of step S47. However, there may be times when target position is not reached due to limitations of processing time for actual exposure, and a remaining drive amount arises. In step S55 there is an instruction so as to drive the focus lens by this remaining drive amount.

It is next determined whether or not the 1st release switch is on (S57). Here, the CPU 212 determines whether or not a 1st release switch of a release button within the operation section 206 is in an on state. If the result of this determination is that the 1st release switch is on, processing returns to step S23 and the previously described processing is executed.

On the other hand, if the result of determination in step S57 is that the 1st release switch is not on, it is determined whether or not the camera power supply is off (S59). Here, the CPU 212 determines whether or not to turn the power supply of the camera body 200 off. For example in a case where power supply off has been instructed as a result of operation of the operation section 206 by the user, or in a case where the user has not operated the operation section 206 for a predetermined time, it is determined that the power supply will be turned off. If the result of this determination is not to turn the power supply of the camera body 200 off, processing returns to step S1. On the other hand if it has been determined in step S59 to turn the power supply of the camera body 200 off, the processing of this flow is terminated.

As has been described above, with the one embodiment of the present invention level of a barrier Ptb positioned between LT and LB, and between RT and RB of 4 photodiodes (4PD) is set lower than a barrier Prl positioned between LT and RT, and between LB and RB, giving priority to RL. As a result of this, saturation of electrical charge does not occur in R pixels (RT+RB) or L pixels (LT+LB), even if saturation of electrical charge relating to the barrier Ptb occurs in any one of light receiving sections LT, LB, RT, or TB. Accordingly, compared to a case where barrier Prl and barrier Ptb are the same, it is possible to make charge storage determination level (saturation determination level) of a signal voltage for R/L pixels higher, and it is possible to expand dynamic range. It should be noted that TB priority may be set instead of RL priority. The level of the barrier Ptb positioned between LT and LB, and between RT and RB of the 4PDs may also be set higher than the level of the barrier Prl positioned between LT and RT, and between LB and RB, thus setting TB priority. Also, there may be a configuration in which either an RL priority barrier or a TB priority barrier is set in every 4D pixel, and in a case where R/L pixel signals are used an RL priority 4PD pixel is selected and used, while if T/B pixel signals are used a TB priority 4PD pixel is selected and used.

Figure 10:
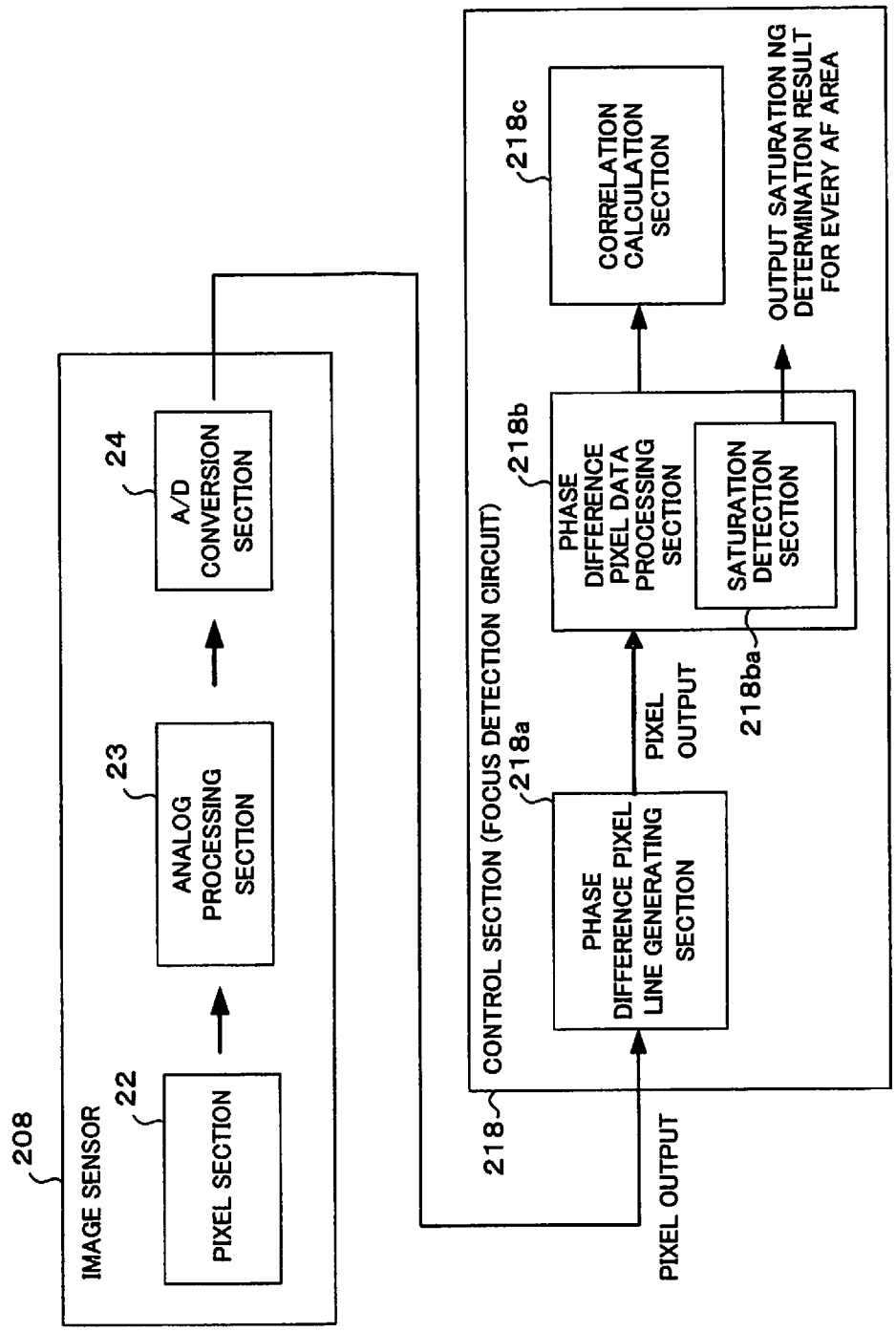
FIG. 10 is a block diagram showing a circuit for setting amplification factor of an image sensor, in an imaging device of a first modified example of one embodiment of the present invention.

Next a modified example of the one embodiment will be described using FIG. 10, FIG. 11A and FIG. 11B. FIG. 10 is block diagram including the image sensor and the focus detection circuit. Description will be given of a setting method of saturation determination level for digital pixel data (hereafter called pixel data) after A/D conversion of the pixel signal, fora case where it is possible to amplify and output a pixel signal in the image sensor 208. With this example, the control section (focus detection circuit 218) sets amplification factor (also called gain) of the image sensor 208, and sets saturation determination level for pixel data after A/D conversion in accordance with the amplification factor that has been set. It should be noted that the control section is not limited to being within the focus detection circuit 218, and some functions may also be realized by other circuits such as the CPU 212.

In FIG. 10, the image sensor 208 is the same as the image sensor 208 shown in FIG. 2, with a pixel signal that has been read out from the pixel section 22 being subjected to amplification processing in the analog processing section 23, and, after being subjected to A/D conversion in the ADC processing section 24, output as pixel data. It should be noted that the memory section 25, horizontal scanning section 26, and output section 27 of FIG. 2 have been omitted from FIG. 10.

Also, there are a phase difference pixel column generating section 218a, phase difference pixel data processing section 218b, and a correlation calculation section 218c within the control section (focus detection circuit 218). The phase difference pixel line generating section 218a has a phase difference pixel line generating circuit, and is a block for outputting added signals output from the image sensor 208 as pixel lines of AF area (focus detection region) units. If there are 100 AF areas, for example, output of 100 pixel lines is performed.

The phase difference pixel data processing section 218b has a phase difference pixel data processing circuit, and performs preprocessing (various correction such as luminance correction, which will be described later) in order to perform correlation calculation. A saturation detection section 218ba is provided within the phase difference pixel data processing section 218b. This saturation detection section 218ba has a saturation detection circuit, and for every AF area, determines saturation NG in a case where pixel data has exceeded a saturation determination level, and outputs that result. The saturation determination level will be described later using FIG. 11A and FIG. 11B. The correlation calculation section 218c has a correlation calculation circuit, and performs correlation calculation using output of the phase difference pixel data processing section 218b.

If gain (pixel signal amplification factor) of the image sensor 208 is changed, saturation level of the pixel signal also changes, and so it is necessary to change saturation determination level of pixel data, which is digital output, in accordance with that change. With the imaging device 1, an output value of the ADC processing section 24 corresponding to a saturation determination level of a pixel signal when gain of the image sensor 208 is 1 is stored as saturation determination level for pixel data. Then, the focus detection circuit 218 increases the saturation determination level by a gain factor if gain is increased. In a case where value of this saturation determination level exceeds the dynamic range of digital data within the focus detection circuit 218 (data variance range), the saturation determination level is topped out at a maximum value of that dynamic range.

Saturation determination level for gain of the image sensor 208 is shown in FIG. 11B, and a graph of change in RL saturation determination level with respect to analog gain of the image sensor 208 is shown in FIG. 11A. As shown in FIG. 11B, the saturation determination level for R/L pixel data (refer to S27 in FIG. 9B) and the saturation determination level for T/B pixel data (refer to S31 in FIG. 9B) are different (refer to FIG. 4A), and R/L saturation determination level and T/B saturation level are stored in accordance with gain. The focus detection circuit 218 (saturation detection section 218ba) changes saturation determination level in steps S27 and S31 of FIG. 9B as gain increases, in accordance with FIG. 11B. The saturation detection section 218ba sets saturation determination level in accordance with conditions of pixel data for which whether or not there is saturation will be determined, namely whether it is R/L pixel data or T/B pixel data, and gain. It is determined that there is saturation in the event that pixel data exceeds the saturation determination level. It should be noted that in FIG. 11A and FIG. 11B, digital data within the focus detection circuit 218 is handled as 12 bit data (4096 LSB), and an upper limit for dynamic range is made 3800 LSB as one example.

Next, saturation detection of pixel data that has been subjected to luminance correction, in a case where luminance correction is executed in order to correct light amount distribution characteristics caused by aberration of an optical system, will be described as a second modified example, using FIG. 12. With this example, R/L pixel data that is output from the image sensor 208 is read out, and luminance correction processing is performed on this R/L pixel data to generate data after correction. Whether or not data before correction is saturated is determined by comparing pixel data before performing this correction with the saturation determination level.

Light amount distribution characteristic is corrected using luminance correction values (refer to FIG. 12) that can be derived using light receiving sensitivity characteristic of R/L pixels (RT+RB, LT+LB) of the image sensor 208 and optical characteristics of the photographing lens. Pixel data after correction PIaft can be derived from equation (1) below, using pixel data before correction PIpre and correction value C. The phase difference pixel data processing section 218b executes calculation of equation (1) below. It should be noted that i is pixel number, and correction value C is normally 1.0 to 5.0.

$$\text{PIaft}(i) = \text{PIpre}(i) \times C(i) \tag{1}$$

Figure 12:
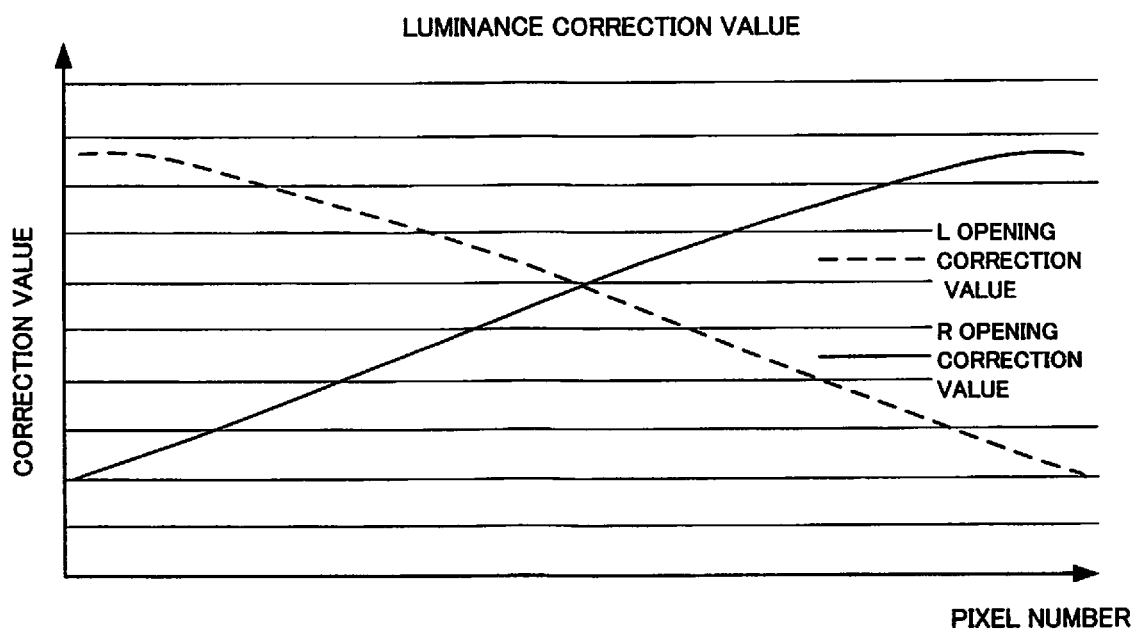
FIG. 12 is a graph and table showing a correction amount for each pixel at the time of lens fitting, in an imaging device of a second modified example of one embodiment of the present invention.

FIG. 12 shows correction value (luminance correction value) C for R/L pixels when a particular photographing lens has been attached to the camera body. In FIG. 12, the horizontal axis represents pixel position along the row direction on the image sensor 208, and the vertical axis represents correction value C. Correction values for L opening pixels (L pixels (LT+LB)) and R opening pixels (R pixels (RT+RB)) are left right symmetrical with respect to the center of the image sensor 208, due to characteristics of the optical system. Correction values C are obtained from previous measurement or from calculation, and stored in memory. For each pixel value it is possible to perform luminance correction by correcting using equation (1).

The focus detection circuit 218 (saturation detection section 218ba) determines saturation when pixel data PIpre before luminance correction exceeds the RL saturation determination level (refer to FIG. 11A and FIG. 11B) (refer to S9 in FIG. 9A, and S27 in FIG. 9B). As was described previously, because error detection and detection precision are lowered if correlation calculation is performed with pixel data that is saturated, detection of AF areas (focus detection regions) that contain a specified number or more of saturated pixel data is not possible. Alternatively, correlation calculation may be performed by performing processing such as to replace saturated pixel data with other pixel data (for example, surrounding pixel data). The above description relates to R/L pixel data, but the situation is similar for T/B pixel data (RT+LT/RB+LB), where before performing luminance correction using luminance correction values for T/B pixels stored in memory, saturation is determined using TB saturation determination level (refer to FIG. 11B). By performing saturation detection for pixel data before luminance correction in this way, high precision focus detection using focus detection calculation of only appropriate pixel data becomes possible.

Next, a third modified example will be described. With this embodiment, a description will be given for a case where R pixel data and L pixel data is respectively read out. As a different method to the method of reading out pixel data, there is a method of, after having performed one-line readout of an R pixel (RT+RB) signal, performing one-line readout of (R+L) pixels (4PD addition) for the same pixel line. With this method it is possible to acquire pixel data for L pixels by calculating a difference {(R+L)−R} between two sets of pixel data, being pixel data for R pixels only (R), and pixel data (R+L) corresponding to a signal resulting from having added an R pixel signal and an L pixel signal. In this case, it is judged whether or not saturation determination level has been exceeded for the {(R+L)−R} pixel data.

Figure 13:
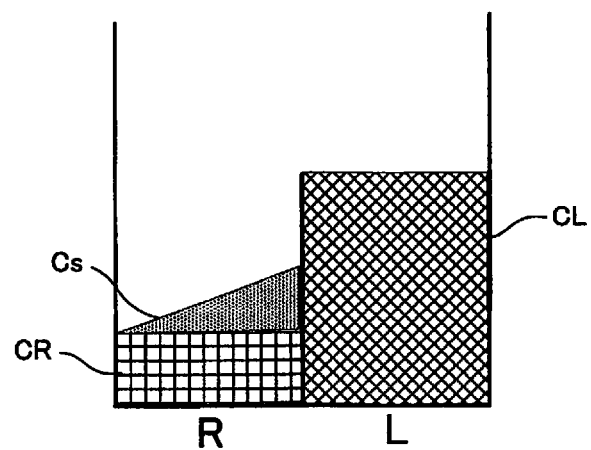
FIG. 13 is a drawing showing a state where an L pixel is saturated, and electrical charge is overflowing to an R pixel side, in an imaging device of a third modified example of one embodiment of the present invention.

FIG. 13 in a conceptual diagram of electrical charge of L/R pixels. For example, as shown in FIG. 13, in a state where electrical charge CL of an L pixel is saturated and exceeds a barrier, and charge Cs leaks out into the R pixel, electrical charge Cs that has overflowed from the L pixel is accumulated in the R pixel, separately to the charge CR that has been photoelectrically converted by the R pixel. In this case, since electrical charge is not saturated in the R pixel, it is determined by saturation determination for the R pixel data that there is not saturation. However, it is determined by saturation determination for L pixel data obtained by calculating a difference {(R+L)−R} between (R+L) pixel data and R pixel data that the L pixel data is saturated. Accordingly, it is possible for charge saturation of the L pixel to arise and for saturation NG to be judged, and it is possible to judge that R pixel data is also not appropriate. In this case also, it is possible to correctly judge that correlation calculation results using this type of RL pixel data is inaccurate.

As has been described above, the detection device of one embodiment of the present invention comprises an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal (refer, for example, to FIG. 3A and FIG. 3B), and a control section (controller) for performing focus detection or depth detection using phase difference detection, based on the added signal of the image sensor (refer, for example, to the focus detection circuit 218 and CPU 212 in FIG. 1, and S35 in FIG. 9B). Also, the image sensor makes height of a potential barrier between the light receiving sections different in accordance with the plurality of phase difference detection directions (refer, for example, to Ptb and Prl in FIG. 4A). The control section (controller) instructs a specified phase difference detection direction to the image sensor to execute a charge storage operation of the image sensor, sets charge storage determination level that is different depending on phase difference detection direction, and controls the charge storage operation of the image sensor based on an added signal and the charge storage determination level (refer, for example, to S9 and S13 in FIG. 9A, and S27 and S31 in FIG. 9B). As a result the dynamic range of signals of the phase difference detection pixels can be made larger, and it becomes possible to improve AF precision and make operations high speed.

It should be noted that with the one embodiment of the present invention, some or all of the focus detection circuit 218, image processing circuit 214, image compression and expansion section 216, exposure control circuit 220 etc. may be integrated with the CPU 212 and the peripheral circuitry of the CPU. It is also possible for the focus detection circuit 218, image processing circuit 214, image compression and expansion section 216, exposure control circuit 220 etc. to have a hardware structure such as gate circuits that have been generated based on a programming language that is described using Verilog, and also to use a hardware structure that utilizes software such as a DSP (digital signal processor), and also to be respective circuit sections of a processor made up of integrated circuits such as an FPGA (Field Programmable Gate Array). These approaches may also be suitably combined. Alternatively, a processor that is constructed with one or more CPUs may execute functions of each section, by reading out and executing computer programs that have been stored in a storage medium.

Also, with the one embodiment of the present invention, a device for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. In any event, it is possible to adopt the present invention as long as a device adopts phase difference AF on an image plane.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'unit,' 'component,'

'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A detection device, comprising:
    an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal, and
    a controller for performing focus detection or depth detection using phase difference detection, based on the added signal of the image sensor, whereby
    the image sensor makes height of a potential barrier between the light receiving sections different in accordance with the plurality of phase difference detection directions, and
    the controller executes a charge storage operation of the image sensor by instructing a specified phase difference detection direction to the image sensor, sets a charge storage determination level that differs in accordance with the phase difference detection direction, and controls the charge storage operation of the image sensor based on the added signal and the charge storage determination level.

2. The detection device of claim 1, wherein: the controller sets the charge storage determination level in accordance with height of the potential barrier corresponding to the phase difference detection direction.

3. The detection device of claim 1, wherein:
    the controller compares the added signal with the charge storage determination level, and controls the charge storage operation of the image sensor based on a result of comparison.

4. The detection device of claim 1, wherein:
    the image sensor is capable of amplifying and outputting the added signal, and
    the controller sets an amplification factor of the image sensor, and sets the charge storage determination level in accordance with the amplification factor that has been set.

5. The detection device of claim 1, wherein:
    the controller sets a saturation determination level in accordance with height of the potential barrier corresponding to the phase difference detection direction, and determines saturation by comparing the added signal output by the image sensor with the saturation determination level.

6. The detection device of claim 5 wherein:
    the controller controls the charge storage operation of the image sensor based on the determination result.

7. An imaging device having the detection device of claim 1, the imaging device being capable of continuous shooting of still pictures based on an added signal resulting from having added all output signals of the plurality of light receiving sections on the image sensor, whereby:
    in a case where added signals of a plurality of light receiving sections corresponding to the phase difference detection direction are acquired by causing imaging by the image sensor, between continuous shooting of still pictures, the controller reads out only added signals corresponding to a phase difference detection direction for which potential barrier has been set higher, as the added signals of the plurality of light receiving sections corresponding to the phase difference detection direction.

8. A detection method, for a detection device having an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting the added signal, the detection method comprising:
    making height of a potential barrier between the light receiving sections different in accordance with the plurality of phase difference detection directions,
    executing a charge storage operation of the image sensor by instructing a specified phase difference detection direction to the image sensor, setting a charge storage determination level that differs in accordance with the phase difference detection direction, and controlling the charge storage operation of the image sensor based on the added signal and the charge storage determination level, and
    performing focus detection or depth detection using phase difference detection, based on the added signal of the image sensor.

9. The detection method of claim 8, further comprising:
    setting the charge storage determination level in accordance with height of the potential barrier corresponding to the phase difference detection direction.

10. The detection method of claim 8, further comprising:
    comparing the added signal with the charge storage determination level, and controlling the charge storage operation of the image sensor based on a result of comparison.

11. The detection method of claim 8, further comprising:
    amplifying and outputting the added signal from the image sensor, and
    setting an amplification factor of the image sensor, and setting the charge storage determination level in accordance with the amplification factor that has been set.

12. The detection method of claim 8, further comprising:
    setting a saturation determination level in accordance with height of the potential barrier corresponding to the phase difference detection direction, and determining saturation by comparing the added signal output by the image sensor with the saturation determination level.

13. The detection method of claim 12, further comprising:
    controlling the charge storage operation of the image sensor based on the determination result.

14. The detection method of claim 8, being provided in an imaging device, the imaging device being capable of continuous shooting of still pictures based on an added signal resulting from having added all output signals of the plurality of light receiving sections on the image sensor, wherein the detection method:

in a case where added signals of a plurality of light receiving sections corresponding to the phase difference detection direction are acquired by causing imaging by the image sensor, between continuous shooting of still pictures, reads out only added signals corresponding to a phase difference detection direction for which potential barrier has been set higher, as the added signals of the plurality of light receiving sections corresponding to the phase difference detection direction.

15. A non-transitory computer-readable medium storing a processor executable code, which when executed by at least one processor, performs a detecting method, the processor being provided in a detection device, the detection device having an image sensor provided with a plurality of pixels having a plurality of light receiving sections corresponding to a micro lens, with the plurality of light receiving sections being provided in correspondence with a specified plurality of phase difference detection directions, capable of adding output signals of the plurality of light receiving sections in accordance with the phase difference detection direction and outputting an added signal the detecting method comprising:

making height of a potential barrier between the light receiving sections different in accordance with the plurality of phase difference detection directions, executing a charge storage operation of the image sensor by instructing a specified phase difference detection direction to the image sensor, setting a charge storage determination level that differs in accordance with the phase difference detection direction, and controlling a charge storage operation of the image sensor based on the added signal and the charge storage determination level, and performing focus detection or depth detection using phase difference detection, based on the added signal of the image sensor.

16. The non-transitory computer-readable medium of claim 15, storing further processor executable code, which when executed by the at least one processor, causes the at least one processor to perform a method further comprising:

setting the charge storage determination level in accordance with height of the potential barrier corresponding to the phase difference detection direction.

17. The non-transitory computer-readable medium of claim 15, storing further processor executable code, which when executed by the at least one processor, causes the at least one processor to perform a method further comprising:

comparing the added signal with the charge storage determination level, and controlling the charge storage operation of the image sensor based on a result of comparison.

18. The non-transitory computer-readable medium of claim 15, storing further processor executable code, which when executed by the at least one processor, causes the at least one processor to perform a method, further comprising:

amplifying and outputting the added signal from the image sensor, and setting an amplification factor of the image sensor, and setting the charge storage determination level in accordance with the amplification factor that has been set.

19. The non-transitory computer-readable medium of claim 15, storing further processor executable code, which when executed by the at least one processor, causes the at least one processor to perform a method further comprising:

setting a saturation determination level in accordance with height of a potential barrier corresponding to the phase difference detection direction, and determining saturation by comparing the added signal output by the image sensor with the saturation determination level.

20. The non-transitory computer-readable medium of claim 19, storing further processor executable code, which when executed by the at least one processor, cause the at least one processor to perform a method further comprising:

controlling the charge storage operation of the image sensor based on the determination result.

* * * * *